US010068396B2

(12) United States Patent
Koo

(10) Patent No.: US 10,068,396 B2
(45) Date of Patent: Sep. 4, 2018

(54) LIGHT-BASED SECURITY SYSTEMS

(71) Applicant: John C. S. Koo, Los Angeles, CA (US)

(72) Inventor: John C. S. Koo, Los Angeles, CA (US)

( * ) Notice: Subject to any disclaimer, the term of this patent is extended or adjusted under 35 U.S.C. 154(b) by 0 days.

(21) Appl. No.: 14/996,718

(22) Filed: Jan. 15, 2016

(65) Prior Publication Data

US 2017/0206721 A1 Jul. 20, 2017

(51) Int. Cl.
*G05B 19/00* (2006.01)
*G07C 9/00* (2006.01)
*H04B 10/116* (2013.01)
*G06F 21/00* (2013.01)
*G06Q 10/00* (2012.01)

(52) U.S. Cl.
CPC ......... *G07C 9/00015* (2013.01); *G06F 21/00* (2013.01); *G06Q 10/00* (2013.01); *G07C 9/00031* (2013.01); *G07C 9/00087* (2013.01); *G07C 9/00111* (2013.01); *G07C 9/00182* (2013.01); *H04B 10/116* (2013.01); *G07C 2009/00095* (2013.01); *G07C 2009/00253* (2013.01)

(58) Field of Classification Search
CPC ........... H04M 1/0266; H04M 1/72527; H04M 1/7253; H04M 1/72566; H04M 2250/04; G01K 1/14; G01N 33/0004; H04B 10/1143; H04B 10/116; H04B 10/40; H04B 10/808; H04N 5/2256; H04W 76/02; H04W 84/12; H04W 76/10; H05B 37/0272; Y02B 20/48; G07C 9/00111; G07C 9/00309; G07C 9/00015; G07C 9/00031
See application file for complete search history.

(56) References Cited

U.S. PATENT DOCUMENTS

2006/0239675 A1   10/2006   Iizuka et al.
2008/0055041 A1*  3/2008   Takene ................ G07C 9/00111
                                                 340/5.7
2008/0292320 A1   11/2008   Pederson
(Continued)

OTHER PUBLICATIONS

Printout from http://www.economist.com/node/21543470 on Apr. 5, 2012.
(Continued)

*Primary Examiner* — Dionne H Pendleton
(74) *Attorney, Agent, or Firm* — Joseph G. Swan, P.C.

(57) ABSTRACT

Provided are, among other things, systems, methods and techniques for light-based communication. One representative embodiment includes: messaging units disposed at different locations within a space, each including at least one light source (e.g., light-emitting diode or LED); at least one messaging/modulation controller coupled to the light sources and configured to turn the light sources on and off so as to broadcast input digital messages; a central server coupled to the messaging/modulation controller(s) and configured to selectively provide messages to the messaging/ modulation controller(s) for broadcast by different messaging units; and an associate device coupled to the central server and configured to: (a) display a user interface for manually inputting information about individuals within the space and (b) provide such information to the central server, where the central server selects messages to be broadcast by the messaging units based on the information received from the associate device.

19 Claims, 12 Drawing Sheets

(56) References Cited

U.S. PATENT DOCUMENTS

| | | |
|---|---|---|
| 2012/0050061 A1 | 3/2012 | Timm et al. |
| 2012/0060207 A1* | 3/2012 | Mardikar ................ G06F 21/33 726/4 |
| 2012/0116861 A1 | 5/2012 | Dobyns |
| 2013/0010018 A1* | 1/2013 | Economy ........... H05B 37/0272 345/691 |
| 2013/0217332 A1 | 8/2013 | Altman et al. |
| 2013/0317916 A1 | 11/2013 | Gopalakrishnan et al. |

OTHER PUBLICATIONS

Printout from http://en.wikipedia.org/wiki/Li-Fi on Apr. 5, 2012.
Printout from http://www.newscientist.com/article/mg21128225.400-will-lifi-be-the-new-wifi.html on Apr. 5, 2012.
Rodney S. Tucker, Gadi Eisentstein, Steven K. Korotky, "Optical Time-Division Multiplexing for Very High Bit-Rate Transmission", Nov. 1988 Journal of Lightwave Technology, vol. 6 No. 11 pp. 1737 and 1747-1749.
Printout of webpage at http://www.merriam-webster.com/dictionary/game, Merriam-Webster Online Dictionary definition of "game", on Aug. 22, 2013.
Prosecution history of parent U.S. Appl. No. 13/559,372.
Prosecution history of parent U.S. Appl. No. 13/787,737.

* cited by examiner

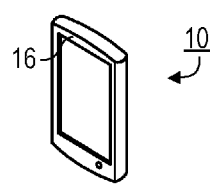
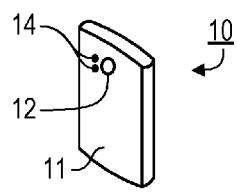
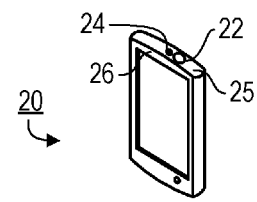
FIG. 1A (Prior Art)  FIG. 1B (Prior Art)  FIG. 2
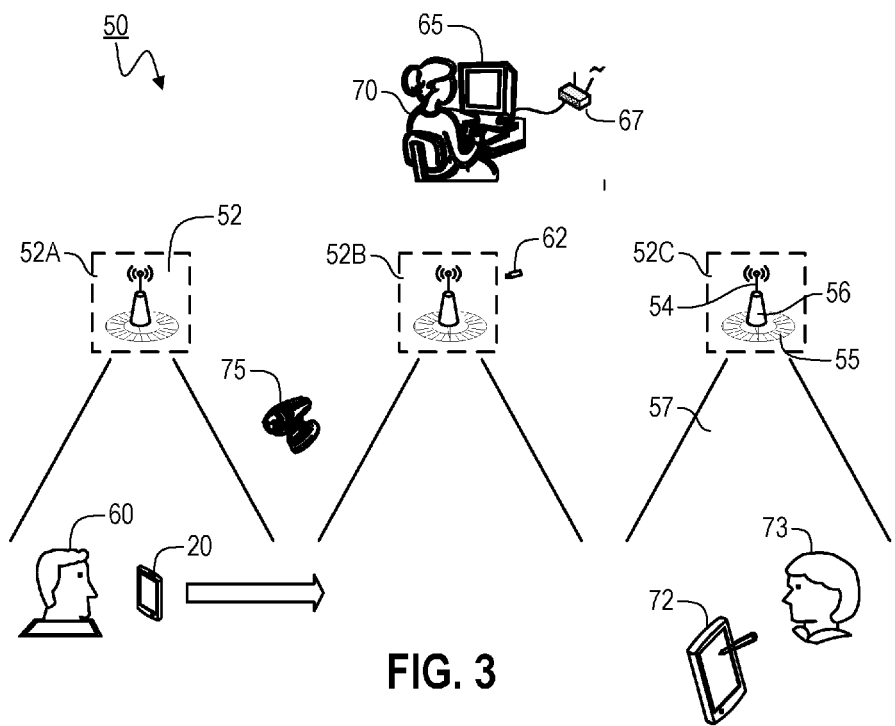
FIG. 3
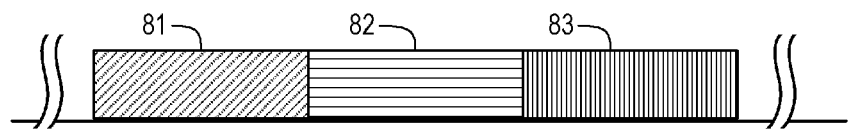
FIG. 4

LIGHT-BASED SECURITY SYSTEMS

This application is a continuation in part of U.S. patent application Ser. No. 13/787,737, filed on Mar. 6, 2013, which in turn is a continuation in part of U.S. patent application Ser. No. 13/559,372, filed on Jul. 26, 2012. Each of the foregoing applications is incorporated by reference herein as though set forth herein in full.

FIELD OF THE INVENTION

The present invention pertains to light-based systems for sending and/or receiving messages, particularly individualized messages based on the locations and/or characteristics of the recipients and/or other individuals.

BACKGROUND

A variety of different messaging systems currently exist. Examples include SMS or text messaging, e-mail, Twitter, Facebook and other social-network messaging protocols. However, each of such systems has its own shortcomings. The present inventor has discovered that one significant problem with existing messaging systems is that they fail to adequately take into account the locations of the individuals who are communicating. Efforts to address this problem typically focus on the use of a global positioning system (GPS) or, in some cases, an indoor variation of such a system. Unfortunately, the present inventors discovered that such solutions often do not work well. Another problem with existing messaging systems that has been discovered by the present inventor is that they often are inadequate at personalizing or individualizing messages.

Also, systems have been used or proposed for tracking and/or monitoring the locations of people or objects. Most of such systems use GPS or related techniques. However, such systems have a number of drawbacks, e.g., in terms of cost and/or the amount of effort required to implement them.

Still further, systems have been used or proposed for providing secured access to various kinds of resources, such as data or physical locations. Such systems typically rely on the use of passwords, physical keys or biometric information. However, these systems also have drawbacks.

SUMMARY OF THE INVENTION

The present invention addresses the foregoing problems, e.g., by providing systems, apparatuses, methods and techniques that employ light-based messaging. Such approaches often can provide: fairly precise location-based and/or characteristic-based message targeting, e.g., for large numbers of people in locations that would not be appropriate for GPS-based systems; spatial tracking of people, machines and other objects; and/or enhanced security systems.

Thus, one embodiment of the invention is directed to a messaging system that includes: messaging units disposed at different locations within a space, each including at least one light source (e.g., light-emitting diode or LED); at least one messaging/modulation controller coupled to the light sources and configured to turn the light sources on and off so as to broadcast input digital messages; a central server coupled to the messaging/modulation controller(s) and configured to selectively provide messages to the messaging/modulation controller(s) for broadcast by different ones of the messaging units; and an associate device coupled to the central server and configured to: (a) display a user interface for manually inputting information about individuals within the space and (b) provide such information to the central server. Preferably, the central server selects messages to be broadcast by individual ones of the messaging units based on the information received from the associate device.

Another embodiment is directed to a messaging system that includes multiple messaging units at different locations within a commercial space, with each of such messaging units including: a light-emitting diode (LED) or other light source; and a messaging/modulation controller coupled to the light source and configured to turn the light source on and off so as to broadcast a digital message, with each of the messaging units configured to broadcast a different digital message, including substantive content that is different from what is broadcast by the other messaging units.

A still further embodiment is directed to a location monitoring system that includes: (a) a plurality of messaging units disposed at different locations within a space, each of such messaging units including: (i) a light source, and (ii) a messaging/modulation controller coupled to the light source and configured to turn the light source on and off so as to broadcast a digital message; and (b) a receiving unit that includes: (i) a light sensor, and (ii) a processor coupled to the light sensor. The messaging units are configured to broadcast different location codes via their corresponding light sources, and the processor is configured to (1) receive the location codes through the light sensor, (2) in response, to obtain location information based on the location codes, and (3) at least one of store and use, or cause the transmission of, the location information.

A still further embodiment is directed to a security system that includes: (a) a messaging unit that includes: (i) a light source, and (ii) a messaging/modulation controller coupled to the light source and configured to turn the light source on and off so as to broadcast a digital message; and (b) a receiving unit that includes: (i) a light sensor, and (ii) a processor coupled to the light sensor; and (c) an access-control unit that includes: (i) a user interface, and (ii) a processor coupled to the user interface. The receiving unit is configured to receive the digital message broadcast by the messaging/modulation controller and, in response, to at least one of display or transmit information based on such broadcast digital message. The user interface of the access-control unit is configured to input a code based on the displayed or transmitted information, and the processor of the access-control unit is configured to verify whether the input code corresponds to a reference code that is based on the digital message broadcast by the messaging/modulation controller and, only if so, to provide access to a secure resource.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIGS. 1A&B are front and rear perspective views, respectively, of a small, portable, mobile device.

FIG. 2 is a front perspective view of an alternate small, portable, mobile device.

FIG. 3 is a block diagram of a messaging system according to a representative embodiment of the present invention.

FIG. 4 illustrates an exemplary timeline showing time-division multiplexing of multiple different messages.

DESCRIPTION OF THE PREFERRED EMBODIMENT(S)

Figure 5:
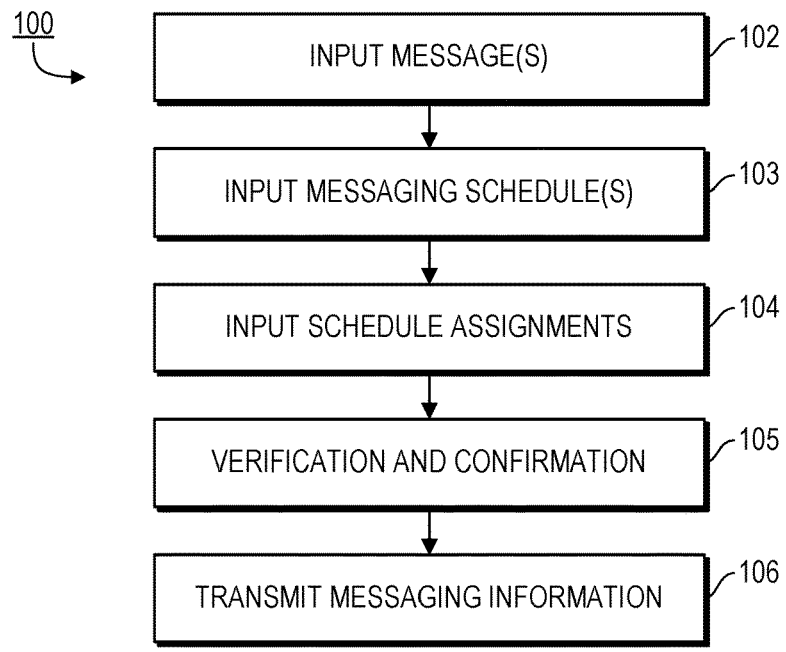
FIG. 5 is a flow diagram illustrating a process, executed by a central computer, for enabling an administrator to create and distribute a messaging pattern.

Any of a variety of different conventional, portable, typically handheld user devices can be used within, or included within, a system according to the preferred embodiments of the present invention. One example of such a user device 10 (which could be a mobile cellular-based phone or a tablet computer) is shown in FIGS. 1A&B. As shown, user device 10 includes, on its back side 11, a light sensor 12 (typically a camera) and one or more light sources 14 (such as light-emitting diodes or LEDs, e.g., of the type conventionally placed in close proximity to the camera 12 and used as a camera flash, among other things). To achieve greater reception efficiency in certain environments, a user device 20 (e.g., a mobile phone or tablet computer), shown in FIG. 2, also (or instead) includes a light sensor 22 (such as a camera or a simple light-detecting sensor) and/or a light source 24 (preferably one or more LEDs) on its top edge 25. Similarly, a light sensor and/or a light source also (or instead) can be included on the front side 16 or 26 of a user device (e.g., user device 10 or 20, respectively).

For ease of description, the following discussion typically refers to user device 10 or user device 20; however, it should be understood that such references can be replaced with references to any other portable (typically handheld) user device, such as any of the devices contemplated herein. In fact, any appropriately configured user device can be used in any embodiment of the present invention. The preferred user device includes at least: (1) a processor and storage medium for executing and storing a software application (or set of computer-executable process steps) to provide the functionality ascribed to user device 10 or 20 herein (typically referred to herein as the "user app"); (2) a light sensor for receiving the broadcast, modulated light discussed herein; and (3) and one or more hardware user interface components (typically, a display screen and/or a speaker or output audio jack) for presenting the received messages that are discussed herein. It is noted that the expression "presenting messages" and similar expressions are used herein to refer to visually showing, displaying, playing or otherwise providing such messages, which could involve presenting any kind of content or any combination of different kinds of content (e.g., any combination of text, graphics, images, audio and/or video content). In addition, in certain embodiments it is preferable for the user device to have other hardware and/or software capabilities, such as the ability to wirelessly access the Internet and/or a light source for also (or even instead) transmitting messages within a system according to the present invention.

Location-Based Messaging within a Designated Space

One such system 50, shown in FIG. 3, includes a user device 20 (preferably running the user app) and a plurality of messaging units 52 (such as messaging units 52A-C) disposed at different locations throughout an overall space. In the preferred embodiments, this space is a commercial space, such as a single retail store (or other establishment) or a shopping center or mall containing a plurality of independently managed and/or operated retail establishments. However, a system according to the present invention can be implemented in any kind of (typically large) space. Although only three messaging units 52A-C are shown in FIG. 3, more typically there will be many more such messaging units 52, e.g., at least 5-50 such units.

Each of the messaging units 52 preferably includes one or more light sources 55 (typically, each such light source including one or more LEDs) and a processor-based messaging/modulation controller 56. However, the messaging/modulation controller 56 need not be included within a messaging unit 52; instead, one or more messaging/modulation controllers 56 may be coupled to one or more messaging units 52 (so that each controller 56 controls one or more messaging units 52). Nevertheless, for ease of description, the following discussion assumes that each messaging unit 52 includes its own controller 56.

In the current embodiments, each messaging unit 52 broadcasts a digital message, including substantive content that is different than the substantive content of the digital messages broadcast by all (or a majority or at least some) of the other messaging units 52. However, such messages preferably are coordinated with each other in order to provide a desired overall user experience. To broadcast such message(s), each controller 56 modulates (typically by turning on and off) the light 57 emitted from the unit's light source 55. Then, as any particular user device 20 is moved about within the space covered by the messaging units 52, it receives the light 57, and therefore the corresponding digital message, from different ones of the messaging units 52. For example, as depicted in FIG. 3, user device 20 currently is receiving and presenting to user 60 any message(s) broadcast by messaging unit 52A; then, as user device 20 is moved forward by user 60, it ceases to receive (or at least to present to user 60) messages broadcast from messaging unit 52A and begins to receive and present to user 60 messages broadcast from messaging unit 52B. In this way, the system 50 provides a structure for communicating different messages at different locations within the overall space and, typically, for fairly precisely controlling what messages are presented at different locations and/or (e.g., in the embodiment described below in reference to FIG. 10) even at different orientations of the user 60.

Each light source 55 preferably is modulated on and off at a very high rate (e.g., at least 1,000, 10,000, 100,000, 1 million, 10 million or 100 million times per second) so that, although a binary signal is being broadcast via such modulation, the variation is too fast to be noticed by the human eye. The sensor 22 of user device 20 receives this modulated light, decodes it and presents the corresponding message, in accordance with the logical rules encoded in the user app and, in some embodiments, with the user app referencing data that it previously stored into the memory of user device 20.

The user app often will have been initially downloaded by the user device 20 via a wireless Internet connection or else will have been downloaded by a different computer (via its Internet connection) and then transferred to user device 20. Upon such initial downloading, the user 60 preferably has the ability to establish a profile (and in some cases is incentivized or required to do so), and preferably may elect to have special offers and/or suggestions delivered to him or her via in-store communications and/or may elect to have such notifications sent to him or her, irrespective of his or her location, by e-mail, via a social-networking site or in any other manner. Thereafter, updates to the user app and/or additional (e.g., pre-stored) content can be received in either of those ways, or instead can be downloaded from one of the messaging units 52 (e.g., the first messaging unit 52 that device 20 receives from after entering the space. Still further, if the user device 20 previously had an application for interfacing with Li-Fi system 50, the user app initially could have been downloaded from one of the messaging units 52.

As indicated above, in addition to transferring messages and delivery schedules into the controller 56, in certain embodiments of the present invention pre-stored content also can be placed in the controller 56. Typically, such pre-stored content is content that is intended to be used by multiple different messages and can include, e.g., logos, backgrounds, music and/or other audio clips.

The digital messages and other content broadcast by the messaging units 52 can be encoded using any of the techniques used for other kinds of digital transmissions. In addition, multiple messages (and/or other kinds of content) can be delivered simultaneously by using time-division multiplexing (i.e., broadcasting each message in a stream of time slices that alternate with the times slices allocated to the other messages), or by using any other multiplexing technique. As a result, for example, in these embodiments it is possible to simultaneously broadcast both a new message and any update to the user app or the pre-stored content accessible by it.

In the preferred embodiments, the messages broadcast by the messaging units 52 are modified or replaced from time to time, e.g., from moment to moment, at different times of day, and/or over extended periods of time. In this regard, the controller 56 preferably includes memory and/or one or more other storage devices that store one or more such messages and computer-executable process steps for implementing the controller functionality described herein (typically referred to as the "messaging app"). The controller 56 also includes a processor for executing the messaging app. Still further, in certain embodiments the controller 56 includes a real-time clock and/or scheduling information also is stored into its storage device(s); then, the messaging app can cause different messages to be broadcast, e.g.: at different times of the day, on different days of the week, in one or more specified sequences, at one or more different time intervals and/or in any other time-varying manner. In this way, once the controller 56 is loaded with a set of messages and a schedule, it can automatically change the messages that it causes to be broadcast over time in accordance with any specified schedule.

Typically, however, it also will be desirable, from time to time, to change the stored messages and/or the schedule according to which they are broadcast. Any of a variety of different approaches can be employed to change or update such information. For example, in certain embodiments, controller 56 is provided with a physical port (e.g., USB), and when a physical storage medium (e.g., flash drive 62 shown in FIG. 3) is inserted into such a port, the messaging app automatically retrieves the new or replacement messages and scheduling information stored within it and uses it to update and/or replace the corresponding information currently stored within the storage device(s) of controller 56.

More preferably, however, such updates are delivered automatically to the individual messaging units 52. Some of the reasons for this preference are that there often will be a large number of messaging units 52 and access to them often will be fairly cumbersome, e.g., when they are mounted on or within the ceiling. Therefore, the messaging units 52 preferably are in (or capable of) real-time communications with one or more central computers (e.g., computer 65), and both the individual messaging units 52 and such a central computer 65 are configured to interface with each other, e.g., such that computer 65 can directly address and update each desired messaging unit 52.

Even more preferably, as shown in FIG. 3, the communication link between the central computer 65 and the individual messaging units 52 is a wireless link (e.g., a WiFi network according to any of the 802.11x protocols). For this purpose, computer 65 is shown connected to a wireless router 67, and the controller 56 within each of the messaging units 52 includes a corresponding wireless transceiver and antenna 54. In addition, for covering a large space, one or more wireless signal repeaters may also be incorporated into system 50. In any event, although a hardwired network instead could be used, wireless technology eliminates the effort and expense of having to physically connect all of the messaging units 52 to such a network. On the other hand, use of a hardwired network often will be a good option when infrastructure already exists, e.g., using the same lines from which central computer 65 and the messaging units 52 obtain their electrical power to also transmit communication signals.

The messaging app (e.g., including any wireless communication interfaces) preferably is stored within each controller 56 as firmware. The scheduling and message information preferably is stored within a non-volatile storage device, such as flash memory, within the corresponding controller 56. Preferably, however, most of the functionality is implemented by computer 65, with the individual messaging units 52 including just enough processing power and corresponding functionality to perform message and schedule updates, to implement the stored schedule(s), and to generate corresponding drive signals for their light sources 55 based on the stored digital messages.

In the simplest embodiments of the present invention, the messaging app executed by the controller 56 simply causes its currently loaded message to be repeatedly broadcast, over and over, but that single message is capable of being replaced by a new message, e.g., using any of the techniques described above. However, in certain embodiments, the messaging app continuously broadcasts in accordance with one or more messaging schedules (as discussed in more detail below). In the following discussions, this latter type of embodiment usually is assumed, in order to be as comprehensive as possible.

Also, upon receipt of a signal from the wireless interface (or other interface used for updates) indicating that new updates are available, controller 56 performs the updating operation. In this regard, the updating message preferably includes a set of instructions (or a script) indicating what changes should be made, together with any new or replacement messages or other content. For instance, such a script might include simple statements to delete particular messages, content and/or schedules (each specified with a unique identifier) and/or to add the new blocks of information appended to the received message, with each such new block including a unique identifier, a type identifier (e.g., message, media content or schedule) and a main body that includes the actual content. Similarly, each schedule also can be specified as a script with instructions indicating, e.g.: any condition(s) as to when it should be executed (such as time of day and/or day of week), the sequence in which messages are to be broadcast (if more than one), any messages to be broadcast concurrently (e.g., multiplexed), any desired pauses between sequentially broadcast messages, any specific times at which messages are to be broadcast, and the like.

Also, in certain embodiments the messaging units 50 include real-time clocks. In that case, the messaging app preferably also includes functionality for receiving a timestamp and a synchronization signal and for setting the device's real-time clock to the specified time at the moment indicated by the synchronization signal.

In certain embodiments of the invention (discussed in greater detail below), additional components also are included within system 50. Such components can include, e.g., one or more associate devices 72, each typically being a wireless handheld device, such as a tablet computer or a wireless telephone, but any or all instead could be, e.g., laptop or desktop computers. Each such associate device 72 is operated by an individual 73 who is associated with the system 50 and is coupled to the central computer 65, e.g., via one of the presently disclosed LiFi systems, such as system 50, a wireless Wi-Fi connection, an ethernet connection, or any other wireless or hardwired connection. In addition (or instead) system 50 can include one or more automated sensors 75 (such as a video or still-image camera, operating in the visible and/or infrared spectra, a radio receiver configured to receive transmissions from user devices 20, or a radio transceiver for use in combination with RFID devices) for obtaining information regarding the users 60. Such sensors 75 can be located anywhere in the covered space, such as on items that are being offered for sale, on shelves or other fixtures, or on ceilings, walls or other portions of a structure that makes up, encloses or borders the covered space.

A representative example of time-division multiplexing is shown in FIG. 4. In this particular example, portions of three different messages 81-83 are broadcast using alternating time slices over a relatively short period of broadcast time (e.g., between $10^{-2}$ and $10^{-7}$ second, or even less), followed by a longer time period (e.g., 5-10 times as long) during which the light source 55 remains continuously on, with this pattern repeating potentially indefinitely. Preferably, an entire static message is delivered within a time period of 0.5-3.0 seconds, and time-varying content (such as audio or video) is delivered in real-time. At the same time, because only a relatively small fraction of the time (e.g., a maximum of 10-20%) is used for modulated broadcasting, the intensity of the light need not be significantly reduced.

Computer 65 preferably is configured with a software application that executes a process for allowing an administrator 70 to create and distribute a desired messaging pattern. An example of one such process 100 is discussed with reference to FIG. 5.

Initially, in step 102 a user interface for inputting or creating one or more messages is displayed. If a desired message just includes text, the administrator 70 preferably can simply type in (or otherwise enter) the message. In addition, the displayed interface preferably permits the administrator 70 to specify, e.g.: (1) the display of pre-stored discrete graphical elements and/or a background or wallpaper; or (2) the playing of a pre-stored audio track. Still further, the displayed interface preferably permits the administrator 70 to upload new content (such as images, audio, video, or any combination of such content) and then incorporate such new content into any particular message. In this regard, a variety of conventional software applications exist for authoring content in one or more types of media, and any of the features incorporated into such conventional applications also can be incorporated into the user interface displayed in this step. Preferably, the displayed user interface permits the creation of any number of messages in this manner.

In step 103, a user interface is displayed for creating schedules that specify how and when the message(s) created in step 102 are to be broadcast, e.g., the sequences in which such messages are to be broadcast (if more than one are to be broadcast by a particular messaging unit 52 during any given time period) and/or the times and/or days when they are to be broadcast. In most embodiments, each of the messaging units 52 broadcasts just a single message at any given time. However, the present interface preferably permits the administrator 70 to specify that different messages are to be broadcast at different times of day and/or on different days (e.g., different days of the week).

For this purpose, the present user interface preferably allows the administrator 70 to specify a time segment for each message that has been assigned to a messaging unit or, conversely, to specify different time segments and one or more messages to be broadcast during each. If multiple messages are specified for any particular time segment, the default preferably is that the messages are broadcast sequentially without any significant delay between them, in the order selected by the administrator 70 within the present user interface (e.g., in the order the administrator 70 lists them for that time segment). However, in certain embodiments the present interface provides the administrator 70 with a great deal of flexibility in specifying how and when messages are to be broadcast by individual messaging units 52. In certain embodiments, the present interface even permits the administrator 70 to specify that two or more different messages are to be played simultaneously on the user device (e.g., device 10 or 20). More preferably, however, any such concurrent combinations preferably are specified during the message-authoring process in step 102.

In one example, the foregoing schedule information is input by the administrator 70 in textual format, e.g., using a scripting language such as:

Schedule255(M,Tu,W: 11 AM-1.30 PM; Th,F: 11.30 AM-2 PM)
    Play(Msg435);
    Play_Concurrent(Msg 112, Msg390, dur10 sec);
    Wait(5 sec);
    Play(Msg029);
    Return which would be interpreted to mean that when this schedule (with the unique identifier "Schedule255") has been assigned to a messaging unit 52, it is to be executed on Monday Tuesday and Wednesday from 11:00 AM until 1:30 PM and on Thursday and Friday from 11:30 AM until 2:00 PM (sometimes referred to herein as the "applicability" of the schedule), and during those times the following actions should be executed: play Message 435, then immediately play Messages 112 and 390 together (i.e., simultaneously) for a period of 10 seconds (e.g., one being the visual portion and the other being the audio portion), then wait 5 seconds, then play Message 029, then immediately return to the beginning (i.e., begin again playing Message 435). In this example, it assumed that Messages 435 and 029 have an inherent duration (e.g., a video or audio clip) or a duration that has been explicitly specified within the messages themselves (e.g., as metadata), while Messages 112 and 390 potentially could be played indefinitely (e.g., text, static images and/or looping audio). In alternate embodiments, the present user interface allows the administrator 70 to define schedules (or to otherwise specify the schedule information) using a graphical user interface, e.g., with real-time presentation of the messages that are being specified to be presented, a "start" button and/or a "stop" button.

In the preferred embodiments, it is possible to specify the applicability of a particular schedule to be the "default", either instead of or in addition to specific times, dates and/or days. A default schedule is one that is to be implemented if and when no other schedule currently stored within the messaging unit 52 is applicable. More preferably, at least one schedule stored by each messaging unit 52 is required to be the default schedule, and this requirement preferably is verified in step 105 (discussed below).

It should be noted that the times at which the digital messages are broadcast can be somewhat independent of when those messages are to be displayed (or otherwise played or presented), e.g., by configuring the user device (e.g., 10 or 20) to have buffering capabilities. It is also noted that it is possible to combine this step with step 102, e.g., providing a single user interface for both authoring messages and specifying broadcasting schedules.

In step 104, a user interface is displayed for assigning any of the schedules created in step 103 to any of the messaging units 52. For this purpose, each of such messaging units 52 and each of the schedules preferably has a unique identifier. In one example, a separate window, containing a complete list of the available schedules, is opened for a selected messaging unit 52, and then the administrator 70 simply selects the schedule(s) to be assigned to that messaging unit 52, e.g., by clicking on checkboxes next to the desired schedule(s). It also should be noted that this step 104 can be combined with step 102 and/or step 103, e.g., so that a message is assigned to one or more messaging units 52 at the time it is created, and/or so that messages, schedules and message or schedule assignments are all defined in a single step, and/or so that the instructions for transferring, deleting and/or replacing messages and/or content are generated automatically based on the schedules that have been selected for the corresponding messaging unit 52.

In step 105, a user interface is displayed for performing any desired verification (automatic and/or manual) of the overall messaging pattern that has been specified in steps 102-104. For example, in certain embodiments a map showing the layout of the space covered by the messaging units 52 (e.g., similar to the maps shown in FIGS. 9 and 10, discussed below) is displayed, and then the administrator 70 is able to input any desired day and time and then hover over (or click on) any of the graphic symbols representing the locations of the messaging units 52, causing the corresponding digital message(s) to be presented.

In certain embodiments, this simulation also takes into account functionality that is expected (or known) to be implemented by the user app (running on the user device 10 or 20). For instance, as discussed in greater detail below, in certain embodiments the user app on the user device 10 receives multiple messages from a single messaging unit (as discussed in greater detail below) but only presents one, depending upon the recent location history of the user device 10 (e.g., the sequence of messaging units 52 from which it has received broadcasts). As result, the administrator 70 would be able to click on different sequences of messaging units 52 and observe the corresponding sequences of messages that would be played by the user device 10 of an individual who traveled that same path through the space.

This verification procedure can be important for identifying any problems or schedule inconsistencies. In this latter regard, it might have been the case that two different schedules inadvertently were made active for the same messaging unit 52 and for the same period of time. Preferably, any such overlapping schedules are automatically highlighted in this verification step. Although certain embodiments permit intentionally overlapping schedules (e.g., with the different messages being multiplexed together), more preferably only a single schedule can be made active at any given time for any given messaging unit 52. In any event, based on these verifications, the administrator 70 preferably can either modify the messaging pattern (by revisiting any of steps 102-104) or confirm the existing messaging pattern.

In step 106, the messaging pattern information is transmitted (preferably automatically once the pattern has been confirmed) to the appropriate ones of the messaging units 52. Typically, this step involves transmitting: (1) the new schedules that are to be implemented by the corresponding messaging unit 52 (e.g., with a "store_schedule" command); (2) instructions to delete (or in some cases, just inactivate) any existing schedules that are not currently desired to be executed (e.g., with a "delete_schedule" or "inactivate- _schedule" command); (3) any new content that is needed in connection with the new schedules, such as any new messages and/or any new pre-stored content or other new content that is referenced by, but not explicitly part of, any such new messages (with a "store_content" command); and/or (4) instructions to delete any messages or other content that are no longer needed (with a "delete_content" command).

In certain embodiments, for each of the messaging units 52, only the new or changed information is transmitted, in order to reduce the amount of data transmission required. In any event, the new information preferably replaces any corresponding existing information. The actual information transmitted can also include any combination of (1) raw data that has not been pre-stored by the recipient messaging unit or assumed to have been stored by the user device 10 through its system-interface software application or (2) identification codes for messaging information previously stored by either such device. In certain embodiments, from time to time or upon receipt of an indication that a particular messaging unit 52 is not currently storing the information that it is supposed to, a reset operation is performed in which all the information currently stored in that messaging unit 52 is deleted and a complete set of the proper information is transmitted to it.

In this way, each of the messaging units 52 can be kept up-to-date on an ongoing basis. The processing of such new information by the individual messaging units 52 preferably is performed on a transaction basis (e.g., by or under the control of the controller 56), so that the processing associated with receipt of a new message from computer 65 is performed only when there is an indication that such a message has been received (e.g., on an interrupt basis). When that occurs, the controller 56 of the corresponding messaging unit 52 preferably executes the received commands (e.g., those noted above) in order to store, delete or inactivate any schedules, messages or other content, as applicable. In addition, in certain embodiments the controller 56 also creates or updates and applicability table that indicates when each of the stored schedules is applicable.

Figure 6:
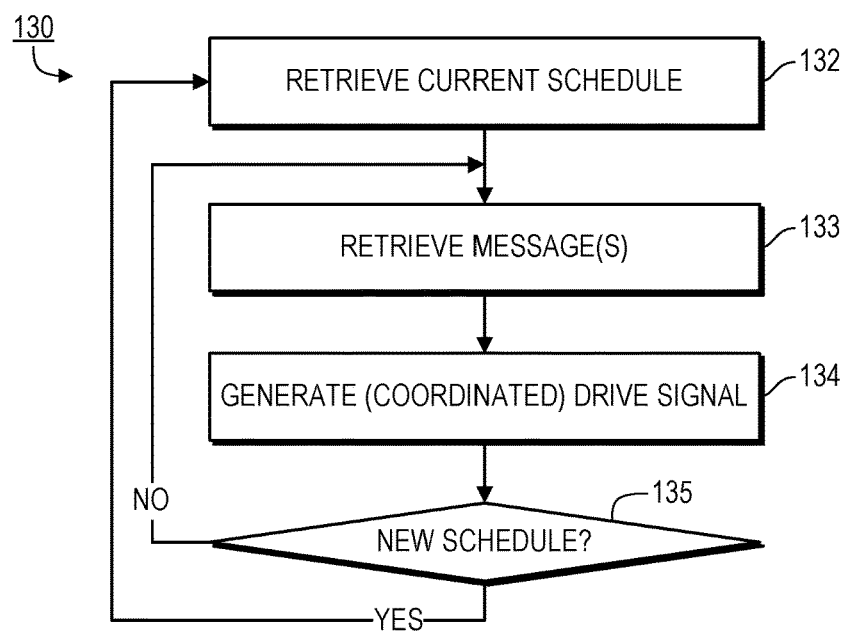
FIG. 6 is a flow diagram illustrating a process, executed by the controller of a messaging unit, for causing messages to be broadcast.

Most of the time, the messaging units 52 broadcast the stored digital messages in accordance with the currently active stored schedules. One example of a process 130 for doing so, e.g., executed by a processor within the controller 56 for the messaging unit 52, is now discussed with reference to FIG. 6.

Initially, in step 132 the currently applicable schedule is identified. This step can be performed by directly reading the applicability information from the stored schedules or by reading such information from an applicability table that has been created for the schedules.

In step 133, the first message (or multiple messages if there is to be a concurrent broadcast) identified in the applicable schedule is retrieved. As noted above, each message preferably has a unique identifier and therefore the current message can be retrieved based on its identifier, as specified in the current schedule.

In step 134, a drive signal for the light source 55 is generated based on the current message. For this purpose, the content preferably is converted into a binary signal, e.g., using any of the techniques conventionally used in conjunction with digital transmissions. Examples include compression, encryption, interleaving and/or error correction/detection. In addition, multiplexing can be used for broadcasting multiple messages simultaneously. Preferably, the signal that is generated is a fairly high-frequency (as noted above) binary-encoded digital signal which corresponds to when the light source 55 is to be turned on and when it is to be turned off. This signal is then output to drive the light source 55 (either directly or after being amplified first). In certain embodiments, the messages are delivered at relatively high frequencies for relatively short periods of time so that the light source 55 is continuously on (i.e., non-modulated) for at least 50-99% of any given interval of 1.00 to 0.01 second. As result, the intensity of the light source 55 (which preferably also is being used to provide illumination) is not unduly impaired as a result of the modulation.

Still further, in certain embodiments the light 57 from one of the messaging units (e.g., unit 52A) significantly overlaps with the light 57 from one of the other messaging units (e.g., unit 52B). In some of such embodiments, the two messaging units coordinate with each other, e.g., using the same wireless network that is also used for communicating with central computer 65 so that each's message is broadcast in a separate set of time slices (i.e., using time-division multiplexing). Alternatively, each's message can have a different code applied to it, within an overall code division multiple access (CDMA) system, so that the receiving user device 10 can selectively receive either one or both. Still further, any other multiplexing technique instead may be used, either with or without coordination between the individual messaging units 52. Instead (or in addition), adjacent messaging units 52 can be provided with light sources 55 that produce different colors, so that they can be distinguished by the user devices 10 or 20 on that basis.

In step 135, a determination is made as to whether a new schedule is now applicable (e.g., the applicability of the current schedule has expired and/or the time period for the applicability of another schedule has just begun). If so, processing returns to step 132 to retrieve and implement this newly applicable schedule, typically instead of (but in some cases in addition to) the current schedule. Otherwise, processing returns to step 133 to retrieve the next message (if any) specified by the current schedule. If the current schedule specifies just a single message, then that message is simply rebroadcast (e.g., immediately or with any specified delay).

Figure 7:
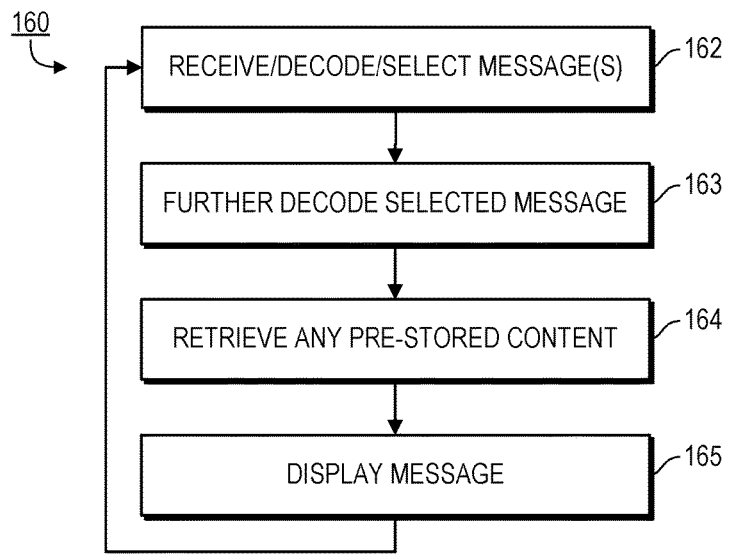
FIG. 7 is a flow diagram illustrating a process, executed by a user device, for receiving and presenting messages.

FIG. 7 illustrates a representative process 160 executed by the user app running on the various user devices 10. Process 160 concerns the receipt and presentation of messages from the various messaging units 52. In addition, the user app may also perform a variety of other functions, e.g., including communications via WiFi or via a wireless Internet connection.

Initially, in step 162 one or more messages is/are received and preliminarily decoded, and then one or more of them is/are selected for further processing. The initial receipt of the messages is via light sensor 12 or 22, which converts the light into an electrical signal. In the case of a camera, the signals from the charge-coupled device (CCD) or other individual elements are summed, averaged or otherwise combined together to provide one signal that represents the light intensity received by the sensor 12 at any given moment. This signal preferably is digitized and high-pass filtered (not necessarily in that order) in order to remove any relatively slow-changing variations. What results is a relatively high-frequency binary signal representing one or more messages from the nearby messaging unit(s) 52.

In the present embodiment, it is assumed (without loss of generality) that when multiple different messages within system 50 are to be broadcast simultaneously and are capable of being received simultaneously, such messages are time-multiplexed with each other. It is noted that simultaneous broadcast can be either from the same messaging unit 52 or from two or more different messaging units 52 and that simultaneous receipt when two or more messaging units 52 are involved typically is because the light 57 from such messaging units 52 shine on the same spot with intensity levels such that one does not completely overwhelm the other.

The preliminary decoding in this step preferably involves demultiplexing in order to identify the message(s) that are to be selected. In this regard, when messages from two or more messaging units 52 are identified after demultiplexing (e.g., based on messaging-unit identifiers included in the messages' metadata), preferably only the message(s) corresponding to the strongest signal is/are selected. However, to avoid switching back and forth between different messaging units 52, the user app preferably also includes logic that keeps track of the messaging unit 52 from which messages are currently being received (e.g., based on the units' unique identifiers) and only switches to a different messaging units 52 when its signal strength exceeds that of the current unit by at least a specified amount (e.g., at least 20-40%), or employs other logic that tends to stay with the current messaging unit 52 until there is a clear indication that the user device 10 has been moved into an area corresponding to a new unit.

Also, as indicated above, the selection of a message (e.g., from among plural messages received from the same messaging unit 52) in this step may be based on past history of the user device 10 (e.g., the sequence of messages presented prior to the present message). The object for implementing this particular aspect of the selection, when employed, preferably is part of an overall game or game-like interaction sequence implemented by the user app.

In step 163, the message(s) from the selected messaging unit 52 is/are further decoded. This further decoding step preferably is just a straightforward reversal of the encoding mentioned above. What results is the original message (assuming from this point forward that there is just one).

In step 164, any pre-stored content referenced in the message is retrieved from one or more storage media in the controller 56. As noted above, rather than repeatedly embedding the same content in different messages, such content may be pre-stored and then just referenced by its unique identifier in multiple different messages.

In step 165, the entire message is presented (e.g., shown visually and/or played audibly). This step can be implemented, e.g., using conventional players and/or other user interface processes.

Figure 8:
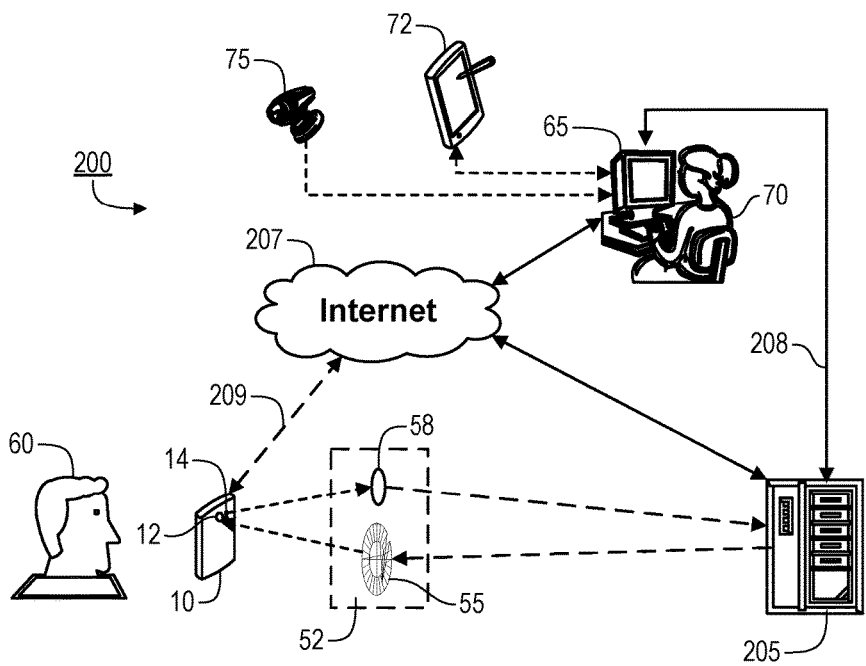
FIG. 8 is a block diagram of an alternate messaging system according to a representative embodiment of the present invention.

The system 50 depicted in FIG. 3 contemplates a situation in which the administrator 70 is on site locally. In a system 200 according to an alternate embodiment illustrated in FIG. 8, the administrator 70 is located remotely from the site covered by the messaging units 52, and the computer 65 communicates with a server 205 via the Internet 207 or another wide-area network 208. Server 205 then relays the messages (preferably wirelessly) to the individual messaging units 52. Also, in this embodiment, the individual user devices 10 can communicate 209 (e.g., via LiFi, Wi-Fi or a wireless Internet connection) directly with the central computer 65 (e.g., to download the user app and/or other content).

Still further, in the present embodiment, in addition to receiving messages broadcast by the messaging units 52, the present user device 10 can transmit messages to such messaging units 52 using its own light source 14. In order to receive these messages, the individual messaging units 52 also include a light sensor 58. In one representative embodiment, the messaging unit 52 initiates the communication and broadcasts synchronization signals. Then, the user device 10 synchronizes or coordinates with the messaging unit 52 so that only one is communicating at any given time.

Any of a variety of different kinds of messages preferably can be transmitted in this way, including, e.g., an identifier for the user device 10, current status information regarding the user device 10, and/or information currently being received by one or more other sensors or user interfaces on user device 10. As a result of these bidirectional communications, the system 200 can provide a more fully interactive experience to the user 60. Such bidirectional communications also can be effected, e.g., via a wireless interface (e.g., a WiFi link to server 205 or a wireless connection 209 to a cellular-based Internet service provider) on user device 10, either alone or in combination with the light-based communications described herein.

As with system 50 depicted in FIG. 3, the present system 200 optionally includes one or more associate devices 72 and/or one or more sensors 75 for obtaining information about the users 60 and/or for any of the other purposes discussed herein. In the illustrated embodiment, an associate device 72 and a sensor 75 communicate with the central computer 65. However, in alternate embodiments they communicate, either directly or indirectly (e.g., through central computer 65), with server 205.

Figure 9:
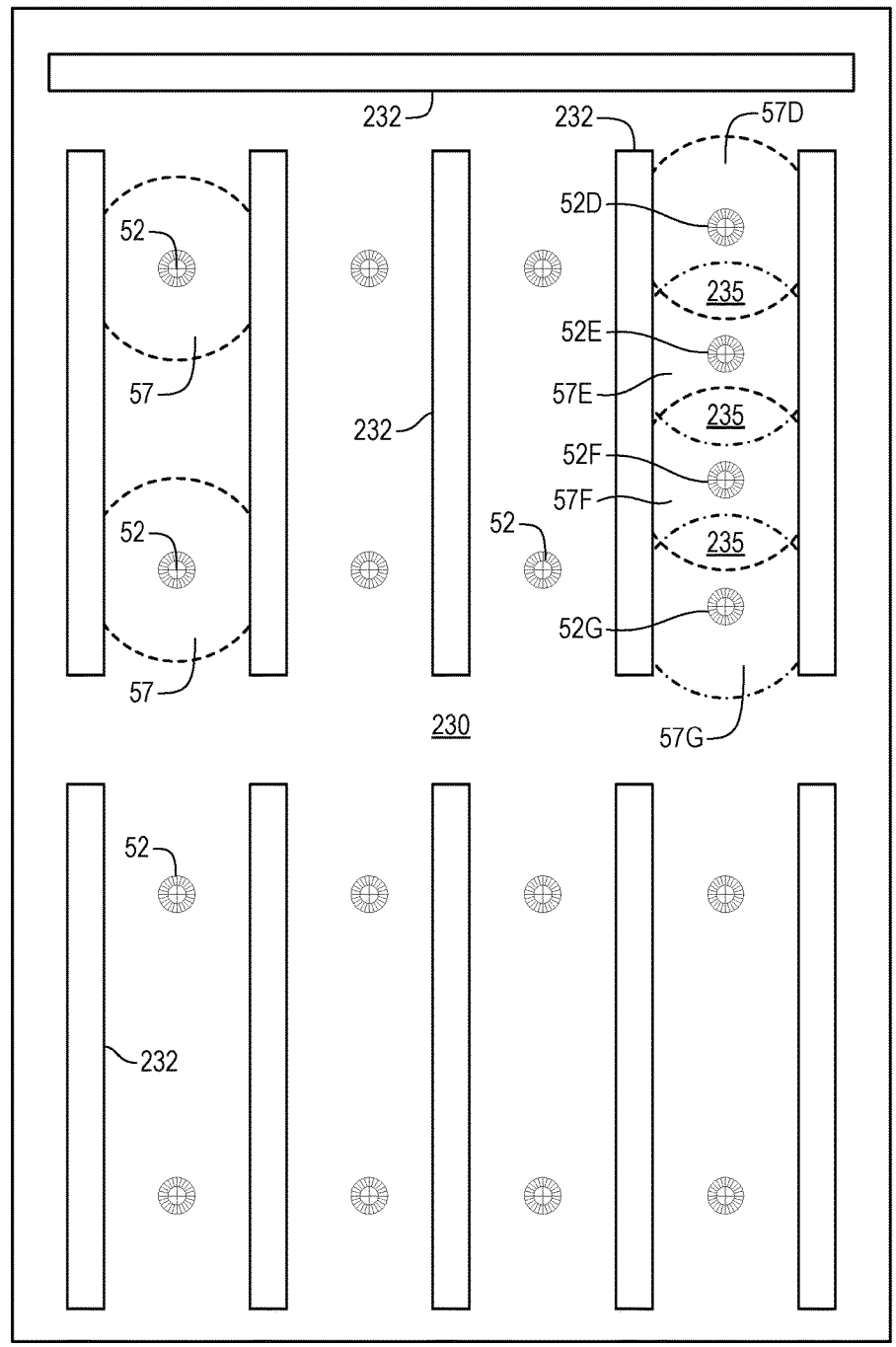
FIG. 9 is a top plan view of a commercial space showing an example of ceiling-based placement of messaging units according to a representative embodiment of the present invention.

A sample layout of a space (or site) 230 covered by a plurality of messaging units 52 is shown in FIG. 9. In this case, the space 230 covered by the messaging units 52 is the interior space of a single retail store, and the messaging units 52 are installed in the ceiling of the aisles between the store's shelves 232 (e.g., replacing conventional light sources), so that the light shines down. However, even the user device 10 (having its light sensor 12 on its back surface) typically will be able to detect the messages, due to reflection of the light 57 that is emitted from the messaging units 52.

As shown, in most of the space 230, the messaging units 52 are sufficiently far apart that the light 57 emitted from their light sources 55 does not significantly overlap. This may be, for example, because conventional light sources (not shown) are disposed between the messaging units 52, so that although the entire space 230 is illuminated, or because in only certain areas are messages being broadcast. However, messaging units 52D-G are sufficiently close to each other that there areas of significant overlap 235 between the light 57D-G, respectively, that they emit. As noted above, in these overlap areas 235, multiplexing, color separation and/or other techniques can be used to distinguish the messages broadcast by one messaging unit 52 from the messages broadcast by another.

Figure 10:
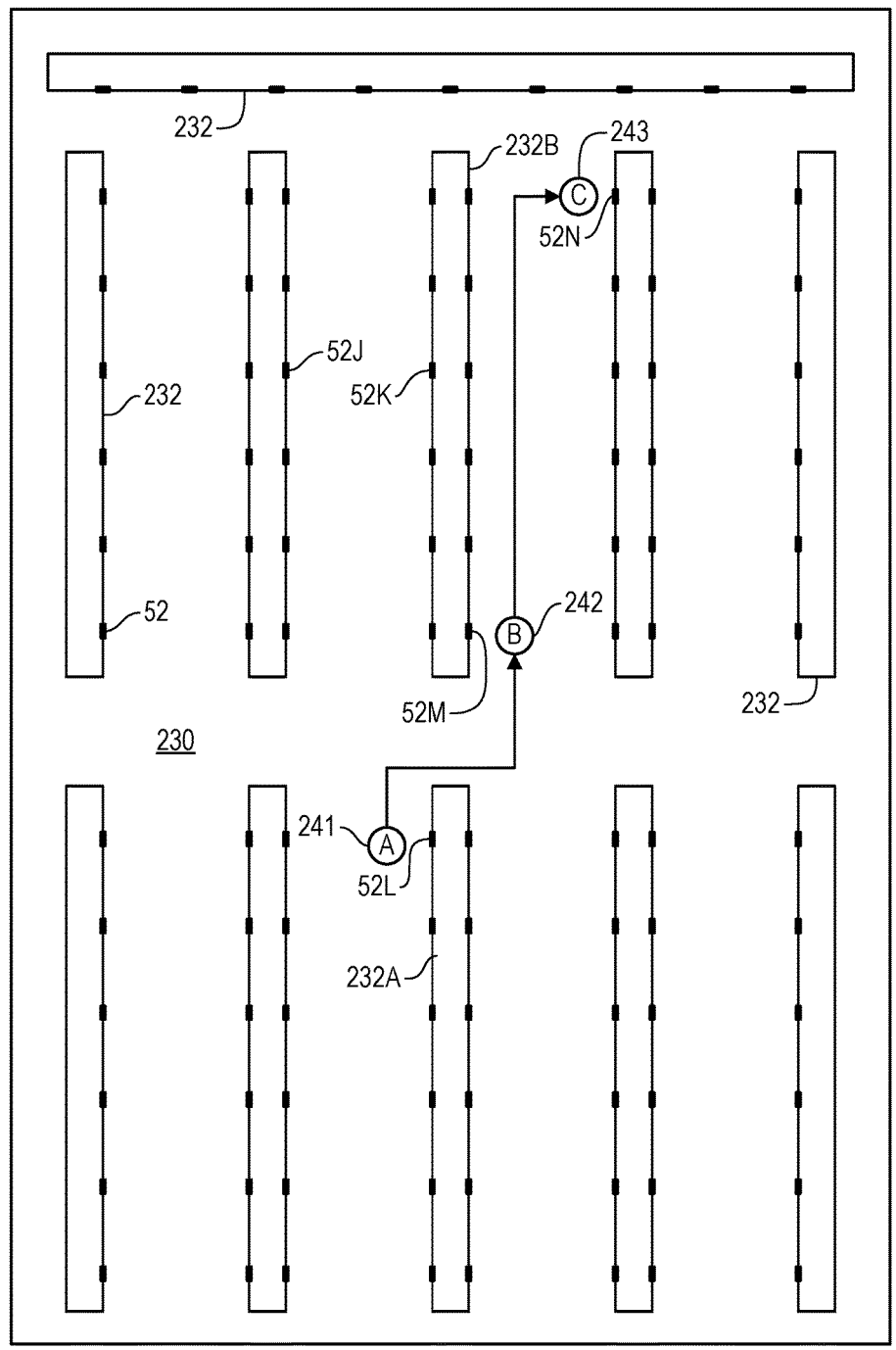
FIG. 10 is a top plan view of a commercial space showing an example of shelf-based placement of messaging units according to an alternate representative embodiment of the present invention, and also illustrating how a user can be guided to different locations within the commercial space.

Another exemplary layout is shown in FIG. 10. Here, messaging units 52 are located on or attached to the shelves 232 so that the light is emitted primarily laterally, rather than downwardly. As a result, the particular message received by a user device 10 might depend not only on the location of the user device 10, but also its orientation (e.g., whether its back surface is generally oriented in the direction of messaging unit 52J or messaging unit 52K which is directly across the aisle).

In addition, FIG. 10 illustrates certain messaging patterns. Initially, for example, the user 60 may be browsing items on the shelf 232A at position 241, facing toward messaging unit 52L. There, the user's device 10 receives and presents a message from messaging unit 52L that might be related to a product on the shelf 232 in fairly close proximity to messaging unit 52L (e.g., a promotional message).

Alternatively (or in addition), the user's device 10 receives and presents a message from messaging unit 52L that directs the user 60 to a different position 242 within the overall space 230, at an orientation facing messaging unit 52M. Such a message might be in the form of a promotion for a product located at or near messaging unit 52M or position 242. Alternatively, such a message might be in the form of a clue or other indirect instruction. In this latter case, the user 60 might need to move about within the space 230 until he or she finally finds the correct position 242 and orientation. In that event, the user app might cease receiving messages until it picks up the broadcast from messaging unit 52M. On the other hand, the user app might be configured so as to receive and present messages from other messaging units (e.g., containing additional clues about position 242 and/or a shelf location near messaging unit 52M). As noted above, user device 10 might receive multiple messages from a particular messaging unit 52 and then select the one with the appropriate clue based on the device's previous history. In any event, a messaging pattern is being used to guide a user 60 around the space 230. This use of individual messages to guide the user 60 may be repeated any number of times, causing or encouraging the user 60 to move to any number of different positions (or shelf locations) within the overall space 230. In the present example, at position 242 facing messaging unit 52M, the user device 10 receives and presents a message that directly or indirectly guides the user 60 to position 243 and toward an orientation where the user 60 is facing messaging unit 52N, so that the entire route consists of three different positions (i.e., guidance to two new positions and orientations from a starting position and orientation).

Such a multi-position guidance messaging pattern can be used in connection with a game, such as a scavenger hunt, or can be used as a part of a marketing system, e.g., encouraging the user 60 to make purchases (or at least look at items) related to what the user 60 currently is looking at and/or related to the user 60's current and/or previous (or historical): purchasing habits, location, orientation, in-store browsing, Web browsing, other online activity, or other type of activities. For any of such purposes, in certain embodiments the user device 10 receives multiple messages (either multiplexed as noted above or contained within a single chunk of data) but the user app only causes the one(s) that are most appropriate based on any of the preceding historical information (and/or any other historical information) to be presented.

Alternatively, e.g., when equipped with its own light source 14, the user device 10 can transmit any such historical information to a nearby messaging unit 52, the server 205 or the computer 65 (e.g., using any of the communication links described herein). Upon receiving such information, the corresponding device executes computer-executable process steps for selecting an appropriate message to be broadcast based on such information.

In any event, although the guidance path shown in FIG. 10 includes just three positions 241-243 (with the user 60 being guided to two positions 242 and 243 from an initial position 241), in many embodiments there will be at least 3-8 such positions to which the user 60 is guided (starting from an initial position), with any combinations of direct and indirect guidance. Also, in the preceding embodiment, the user 60 is guided to specific locations and orientations. Although a similar guidance pattern can be used in connection with the embodiment illustrated in FIG. 9, in such embodiments the system 50 ordinarily will only guide the user 62 positions within the overall space 230 and not to any particular orientation at that position.

In the preceding embodiments, the discussion focused mainly on light-based communications between the light sources 55 and the user devices 10. Typically, this light will be visible light because the light sources can then have the dual purposes of providing the necessary illumination within the space (potentially just replacing any existing light sources) and also providing the messaging functionality discussed herein. For this purpose, the messaging units 52 preferably are physically configured to screw into a conventional light bulb socket or otherwise to fit into a conventional light fixture. At the same time, it is noted that in some embodiments the light emitted by some or all of the light sources 55 is non-visible, such as infrared or ultraviolet.

Also, the foregoing embodiments generally contemplate processes in which a given user device 10 or 20 receives and presents messages in real time from the messaging units 52 to which it is exposed. However, in alternate embodiments the user device 10 or 20 receives (or downloads) messages (in whole or in part) in advance from a single messaging unit 52, but initially just stores them and then only presents them when in the presence of another specified messaging unit 52 or upon the occurrence of any other specified condition. That is, such embodiments use conditional messaging, which can be helpful, e.g., when it is known or expected that a future message will need to be presented but when that message includes a large amount of content or for other reasons might take a long time to receive.

In addition to basing the position of a particular user device 10 or 20 on the identifier for the messaging unit 52 embedded within the messages (or the strongest messages) received by such device 10 or 20, any other indicia can be used by user device 10 or 20, the messaging units 52, the central computer 65 or any other component of the system 50 to help better or more accurately determine the position and/or orientation of the user 60. Examples of such indicia include the relative strength of the light received from multiple different messaging units 52 (due to overlapping light patterns) and/or information provided by the accelerometer, orientation sensor and/or other sensor(s) within the user device 10 or 20.

In addition to (or in some embodiments, instead of) the position and/or orientation of the user 60, any of a variety of other kinds of information can be generated and used within a system according to the present invention. For instance, sensors on the user device 10 or 20, on a shopping basket that is being used by the user 60, and/or on the shelves, walls, ceilings and/or floors of the commercial space can be employed to determine when specific items have been picked up by the user 60 and/or deposited into his or her shopping basket. Such sensors can include, e.g.: (1) a camera for taking photographs and/or videos of the items, which can then be uploaded (e.g., using any of the techniques described herein) to the central computer 65 and/or server 205 for identification of the items (e.g., using conventional image-recognition techniques); and/or (2) one or more RFID sensors (reading corresponding RFID tags on such items). As a more specific example, a conventional RFID tracking system can be used to determine when any particular item is moved closer to the position of a particular user 60, how long that item remains with the user 60, and whether the user 60 ends up keeping the item (such that their positions subsequently move together) or, alternatively, whether the item is returned to the shelf.

Any or all of this information, especially how long the user 60 studied the item and whether or not the user 60 ultimately decided to keep the item, can be used by the central computer 65 and/or server 205 (e.g., executing any conventional collaborative filtering algorithm) to determine what kinds of messages to send to the user 60. Examples of such messages can include promotions, deals and purchase suggestions. In addition, or instead, such information can be used to guide the user 60 through a multi-position pattern, either by itself or in conjunction with any of the other information mentioned above for that purpose.

In the embodiments discussed above, the administrator 70 directly controls the messaging that is sent through the messaging units 52. However, in alternate embodiments, central computer 65 and/or server 205 also (or instead) is accessible by outside entities that have been granted permission (e.g., subject to any constraints imposed by the administrator 70) to design and/or broadcast messages, or at least to submit message broadcasts to administrator 70 for approval before being broadcast.

For example, in one representative embodiment, the system 200 is implemented within a store, shopping center or other building, and specified manufacturers, wholesalers or other suppliers are granted permission to use the system 200 to promote specific items that they provide. In this embodiment, the supplier signs into system 200 using its provided credentials, references a desired product (e.g., by its UPC code) and submits a promotion with respect to such product. In the preferred implementation, if the promotion and/or the supplier has been preapproved by the administrator 70, the promotion is automatically integrated into the message broadcast schedule of system 200. Otherwise, it is automatically submitted for review by the administrator 70 and, only when approved (e.g., as to content and/or timing), is it integrated into the message broadcast schedule. In either case, such integration often will involve server 205 or computer 65 automatically modifying and/or supplementing the submitted promotion, e.g., based on the location of the product within the retail space and/or other location-specific information.

By providing such access to system 200, suppliers can directly communicate with their end customers, e.g., guiding potential customers to certain areas for them to scan the subject product from their phones 20 (or other user devices). At the same time, by charging a fee for such access, retailers also can benefit. Computer 65 or server 205 preferably is configured to present a user interface to administrator 70, providing administrator 70 with significant flexibility in granting or conditioning access rights (e.g., by supplier, by product and by message) so that the corresponding retailer can have as much or as little involvement in the ongoing message broadcasts as it wants.

Tracking and Location Monitoring

In the embodiments discussed above, a network of spatially dispersed messaging units 52 is used for delivering spatially relevant communications. A similar network of messaging units can be used for tracking and/or monitoring the locations of one or more people or items. Such a system can be valuable, e.g.: (1) in a workplace setting for helping management to better understand how resources currently are being deployed, in real time, and how they might be deployed in the future to improve efficiency; (2) in a public or semi-public space for efficiently deploying security personnel; or (3) for coordinating the activities of robots and/or other fully or partially automated devices.

In any of these additional embodiments, the messaging units 52 can be arranged, e.g., as illustrated in FIG. 9 or 10. When used for tracking or monitoring people, a user device 10 or 20, as discussed above, often will be used as a receiving unit within a tracking and/or location-monitoring system according to the present embodiments. However, any of a variety of other types of receiving units instead can be used.

Figure 11:
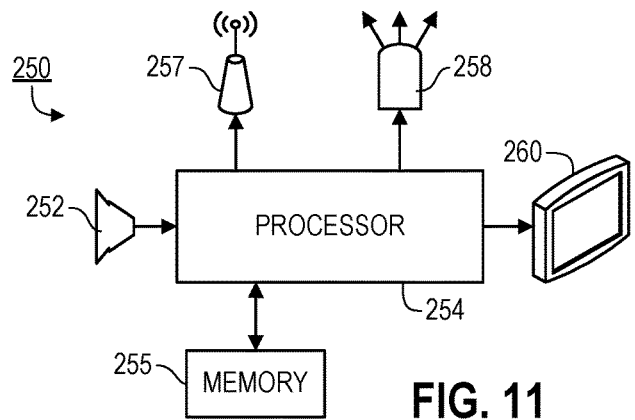
FIG. 11 is a block diagram of a representative receiving unit.

In this regard, FIG. 11 is a block diagram of a representative receiving unit 250 according to the present invention. Included within the receiving unit 250 is one or more sensors 252 for receiving signals broadcast by the messaging units 52 (typically in the form of visible, infrared or ultraviolet light) and converting such received signals into electrical signals. As indicated above, for user devices 10 or 20, one or more built-in cameras can function as sensor(s) 252. Alternatively, e.g., sensor(s) 252 can be implemented as simple light-intensity sensors, such as one or more phototransistors. In any event, the electrical signals output from sensor(s) 252 are provided to a processor 254 which, as discussed in greater detail below, is configured to process such signals in order to obtain more useful information, to store such signals and/or information into memory 255 and/or to cause the transmission of such signals and/or information to one or more other devices, e.g., using a radio transmitter 257 (for radio broadcasts) and/or one or more LEDs or other light sources 258 (for light-based broadcasts). A monitor 260 optionally may be included within, or as part of, receiving unit 250 (e.g., for user devices 10 or 20) for displaying the current location and/or orientation of the receiving unit 250, any other information that is based on such location and/or orientation information, and/or other type of information.

Similar to some of the previous embodiments, each of the messaging units 52 preferably is configured to continually broadcast one or more messages. In certain embodiments the different messaging units broadcast different messages that include different corresponding "location codes", e.g., where each such location code can be used to identify the location of the corresponding messaging unit 52. For this purpose, each such location code can, e.g., either directly specify the location of the messaging unit 52 or can identify the messaging unit 52 so that its location can be determined (e.g., using a lookup table). In certain embodiments, the location code is a CDMA code that the messaging unit 52 utilizes to encode its transmission, thereby allowing the receiving units 250 to distinguish transmissions from different messaging units 52. In addition, or instead, the substance of the message that is broadcast by a messaging unit 52 can include its location code. In certain preferred embodiments, each messaging unit 52 continually and repeatedly broadcasts the same message, such that each essentially serves as a reliable location beacon.

In some embodiments, in order to permit the receiving units 250 to distinguish the different messaging units 52 and/or to provide information that can be used in determining the location of the receiving unit 250, the broadcasts of the different messaging units 52 are coordinated as part of an overall system. For instance, different messaging units 52 might broadcast at different frequencies or otherwise have different pulse patterns, as well as (or instead of) using different CDMA codes. In one set of embodiments, the pulses broadcast by spatially adjacent messaging units 52 are time-division multiplexed.

Figure 12:
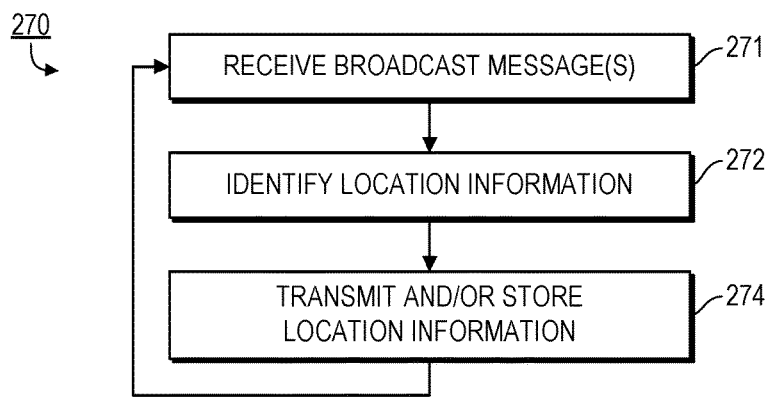
FIG. 12 is a flow diagram illustrating processing performed by a receiving unit according to a representative embodiment of the present invention.

FIG. 12 is a flow diagram illustrating a process 270 performed by a receiving unit 250 within an overall tracking and/or monitoring system according to a representative embodiment of the present invention. Ordinarily, process 270 is performed by processor 254 reading a corresponding set of computer-readable/executable process steps out of memory 255 and then executing them.

Initially, in step 271 the receiving unit 250 receives one or more digital messages that have been broadcast by one or more corresponding messaging units 52 within the network. As noted above, the receiving unit 250 can include just a single omni-directional (at least within a 180° range, e.g., only front-facing or rear-facing) sensor 252 for this purpose, as often would be the case for many user devices 10 or 20, or potentially even plural such sensors 252 (e.g., one on the front and one on the back of such a user device 10 or 20).

Figure 13:
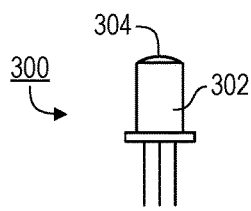
FIG. 13 illustrates a directional sensors for use in certain embodiments of the invention.

Alternatively, the receiving unit 250 can include two or more directional sensors 252, such as directional sensor 300 (shown in FIG. 13). Sensor 300 mainly includes a phototransistor 302 that senses light intensity and also includes at least one lens 304 above its light-sensing element for providing the desired directionality. In alternate embodiments, other optical arrangements, such as mirrors or combinations of lenses and mirrors can be used to provide such desired directionality. In any event, a directional sensor according to the preferred embodiments exhibits its a highest signal gain in one particular direction, and its signal gain decreases the more the angle of the light source varies from that maximum-gain direction. Although directional sensor 300 sometimes is used as an example in the following discussion, references to it may be replaced with references to any other type of directional optical sensor.

Figure 14:
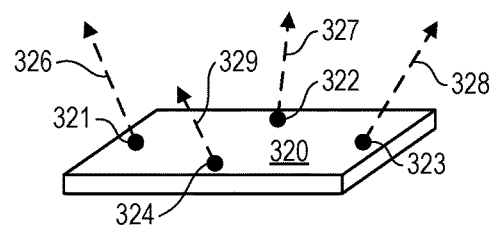
FIG. 14 illustrates a card with four directional sensors.

The use of plural directional sensors 300, pointed in different directions, generally results in two or more distinct electrical signals for each optical signal that is received. One example of such a sensor arrangement is embodied in sensor assembly 320 (shown in FIG. 14), which includes four different sensors 321-324 pointed in four different directions 326-329, respectively. That is, each of the sensors 321-324 has a direction or angle of maximum signal gain (or sensitivity) 326-329, respectively, and as the angle between a light source and the subject sensor diverges from this maximum-sensitivity angle, the gain or sensitivity decreases (i.e., for a given light intensity, the signal level that is detected decreases as this angle increases).

In addition, as noted above but not shown in FIG. 14, sensor assembly 320 preferably includes a processor 254, memory 255 and a transmitter (257 and/or 258), together with a battery, capacitor or other element for storing and then providing electrical energy, so that assembly 320 is an entirely self-contained unit in a relatively small package. In alternate embodiments, in order to power assembly 320, sensors 321-324 can be implemented as photovoltaic cells, separate photovoltaic cells can be included on assembly 320, and/or any other type of electrical-energy-generating device (e.g. generating electricity from motion, changes in temperature, etc.) can be provided on assembly 320, so that assembly 320 can be used continuously without battery replacement or recharging from an external source. It is noted that assembly 320 can be implemented as a single integrated circuit (IC), as a single circuit board, or in any other (preferably small) package.

In many of the embodiments discussed above, a relatively costly multipurpose user device 10 or 20 is used as a receiving unit 250. However, as indicated by the example of assembly 320 above, a simpler special-purpose device instead can be used, e.g., a device that includes just one or more sensors 252, a processor 254 (such as a microcontroller), a small amount of memory 255 (which can be included on the same IC as the processor), and a LED or other type of transmission device 257 or 258. Such a simpler, lower-cost, special-purpose device 320 can be particularly advantageous when tracking or monitoring a large number of people, pets, objects, machines or anything else, and is discussed in greater detail below.

Returning to FIG. 12, in step 272 the receiving unit 250 (e.g., user device 10 or 20, or assembly 320) identifies location information based on the messages received in step 271. This location information can be nothing more than the signal(s) received (e.g., at each of the sensors 321-324). Alternatively, such location information can be generated by processing of the received signals to varying degrees. For example, the receiving unit's processor 254 might identify the messaging unit(s) 52 from which it has received a broadcast message, e.g., in any of the ways discussed above in connection with step 162, such as by using time-division selectivity or code-division selectivity or, even more simply, by detecting an identification code (e.g., a unique code) that has been broadcast by each such messaging unit. Still further, more precise location information (and, potentially, even orientation information) can be generated by: (1) comparing the sensor-generated signals for individual messaging units 52 to determine the angles to such messaging units 52 (as described in greater detail below), and then triangulating to establish a position (or location) for, and/or an orientation of, the receiving unit 250; (2) comparing relative timing of pulses received from multiple different messaging units 52 (particularly where such messaging units 52 have different pulse frequencies or other differences in their pulse characteristics) in order to identify distances to such messaging units 52, and then triangulating; or (3) using any combination of the foregoing techniques and/or any other light-based direction-measuring or distance-measuring technique(s). Generally speaking, the amount of processing used to generate the location information in this step 272 will depend upon the processing-power of the receiving unit 250.

Next, in step 274 the receiving unit 250 transmits (e.g., using transmitter 257 or light source 258) and/or stores (e.g., into memory 255) the location information identified in step 272. Often, the receiving unit 250 will store the location information if it is a multipurpose device (such as a tablet or smart phone) and, therefore, will be able to use its current location in connection with other (e.g., higher-level) processing. On the other hand, for the simpler sensor assembly 320, the receiving unit 250 often will simply transmit the location information on to another device, e.g., for additional processing to identify the location of the receiving unit 250 and/or to use such location information for any of a variety of different purposes. In many cases, transmission will be desirable whether or not the location information is stored for use by the receiving unit 250, so that other systems and/or devices will have access to it. Such transmission, for instance, can be optical (e.g., using its own LED 258) or can use radio waves (e.g., Bluetooth, near-field communications or Wi-Fi).

Thus, in certain embodiments the receiving unit 250 itself identifies its location and/or uses that location information locally for its own processing purposes (e.g., to assist its user or for autonomous navigation). In other embodiments, either or both of such tasks is/are performed by a separate monitoring/tracking device or system, in order to limit the processing load on the receiving unit 250. In either event, at some point the location of the receiving unit 250 is identified (e.g., using any of the techniques discussed above in connection with step 272) based on the location information collected or generated by the receiving unit 250.

The simplest way to determine location is to identify the messaging unit(s) 52 from which messages were received in step 271 and then retrieve the location(s) of such messaging unit(s) 52, e.g., using a lookup table. If messages were received from more than one messaging unit 52, a simple average of their positions can be calculated to determine a coarse location. Alternatively, a weighted average, e.g., based on the signal strength received from each, can be calculated, and in many cases will provide a better estimation of location.

On the other hand, if plural directional sensors were used by the receiving unit 250, then a corresponding plurality of signals will be received for each messaging unit 52, and the broadcast from each messaging unit 52 ordinarily will be received at a different signal strength at each such sensor (assuming the sensors have different directionalities). Comparing and/or processing these differing signal strengths, e.g., using known techniques, can provide a more precise location.

Figure 15:
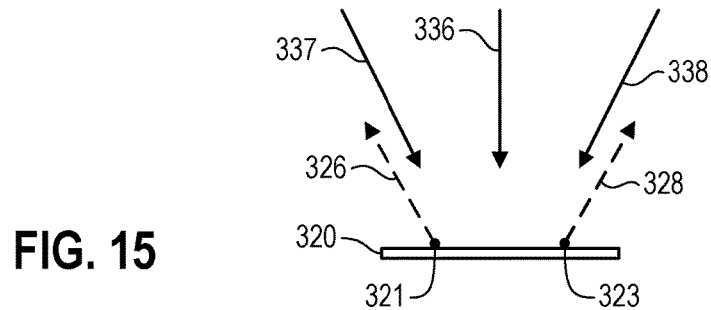
FIG. 15 illustrates overlapping reception patterns forward to directional sensors on a single card.

FIG. 15 illustrates this concept, showing a sensor assembly 320 with two sensors 321 and 323 and their respective reception beam center directions 326 and 328. Light coming from a direction 336 that is directly perpendicular to sensor assembly 320 is approximately 30° offset from each of the center directions 326 and 328. Accordingly, sensors 321 and 323 would detect such light at approximately the same signal level. On the other hand, light coming from the direction 337, which roughly coincides with direction 326 and is approximately 60° offset from directions 328, would be detected at a much stronger level by sensor 321 then by sensor 323. Similarly, light coming from the direction 338, which roughly coincides with direction 328 and is approximately 60° offset from directions 326, would be detected at a much stronger level by sensor 323 then by sensor 321.

In other words, by comparing the signal strengths detected at sensors 321 and 323 (e.g., using a lookup table or a pre-stored formula for that models the gain profiles of the sensors 321 and 323) from a single source, it is possible to fairly accurately identify the position of the source relative to the sensor assembly 320. One way to compare such signal strengths is to calculate a ratio of their magnitudes; then that ratio can be mapped directly (e.g., using a lookup table or a formula) to an angle at which the light is incident upon the sensor assembly 320. One advantage of employing such a ratio is that doing so eliminates any effects of intensity variation from the source (i.e., messaging units 52). However, other ratios (e.g., power ratios or the like) or other comparison metrics instead (or also) can be used. Also, the mapping of the comparison metric value to an angle can be predetermined based on the physics of the sensor assembly 320 or can be determined empirically (e.g., calibrated). Use of additional sensors (resulting in additional signals for characterizing each messaging unit 52 or other source) and/or generating and then processing signals based on the broadcasts received from different messaging units 52 (e.g., resulting in angles to other known points) can provide additional information that can be used to more precisely determine the location and/or orientation of the sensor assembly 320, as well as to identify and correct potential errors (e.g., caused by differential shading of different portions of the sensor assembly 320).

Another technique referenced above involves the calculation of distances based on differences in the pulse characteristics for different messaging units 52. For instance, if two messaging units 52 transmit pulses at different frequencies, then the phase shift between their corresponding signals received by a given sensor 252 will provide an indication of their relative distances. By using coordinated sequences of different frequencies for two or more different messaging units 52, and then calculating phase-shift information from multiple different messaging units 52, actual distances (to these known points) can be determined by taking into account the speed of light and using straightforward mathematics. Then, the location and/or orientation of the receiving unit 250 can be calculated using triangulation.

As noted above, each individual source (i.e., messaging units 52) might be identified, e.g., by decoding the received signals using different CDMA codes for the different sources (in which case the CDMA codes themselves function as identification codes that can be used to determine the locations of the corresponding messaging units 52) or in any other manner in which the individual messaging units 52 broadcast different identification (or, equivalently, location) codes. As indicated in the preceding sentence, a unique identification code, or a non-unique identification code in combination with other information (e.g., past location history that indicates a general current location) that together uniquely identify a messaging unit 52, can be easily mapped to the known location of the messaging unit, so that the terms "identification code" and "location code" often can be used interchangeably. By using multiple directional sensors 300 and/or identifying the positions of multiple signal sources (e.g., messaging units 52), it can be possible to very precisely identify the location and the orientation of the sensor assembly 320 (or other receiving unit 250).

Figure 16:
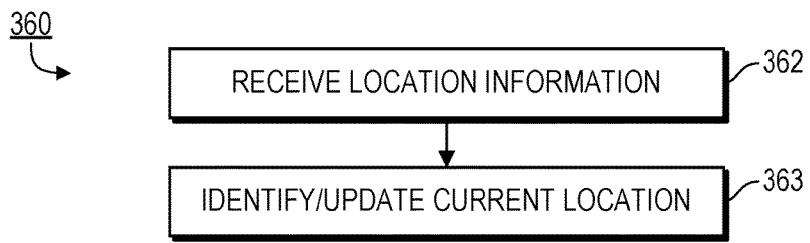
FIG. 16 is a flow diagram illustrating processing performed by a location-monitoring and/or tracking device according to a representative embodiment of the present invention.

FIG. 16 is a flow diagram illustrating a representative process 360 performed by a location-monitoring and/or location-tracking device in response to the transmission of location information in step 274. As indicated above, in certain embodiments, such a device is included in the overall system. For example, with reference to system 50 or system 200, described above, this device might be central computer 65 or server 205. In any event, the following process steps preferably are implemented as computer-executable process steps, which are read out of memory or any other storage device and then executed by one or more computer processors.

Initially, in step 362 the location information that was transmitted by the receiving unit 250 is received. This step can be accomplished in a variety of different ways, typically depending upon the manner in which the location information has been transmitted. For instance, if the message had been transmitted by the receiving unit 250 flashing a LED or other light source 258, it might initially be received by a sensor 58 and then forwarded to the subject monitoring and/or tracking device (e.g., over Wi-Fi, over a LAN or using a direct hardwired connection). On the other hand, if the message had been transmitted via a radio signal, it might initially be received by a nearby messaging unit 52 via its antenna 54, and then forwarded to the subject monitoring and/or tracking device (e.g., over Wi-Fi, over a LAN or using a direct hardwired connection). In any event, the corresponding signal is coupled to the processor for the monitoring and/or tracking device (e.g., either directly or placed in storage for subsequent access by such device).

In step 363, the current location of the receiving unit 250 is identified and/or updated, e.g., in a stored database associated with the subject monitoring and/or tracking device. The processing performed in this step 363 preferably depends upon the format of the received location information. For instance, if the received location information already identifies the location of the subject receiving unit 250, then ordinarily that information is simply stored and/or used (e.g., by another application running on the monitoring and/or tracking device or on any other device coupled to it). On the other hand, in many cases, particularly where the receiving unit 250 has limited processing capacity and/or limited energy resources for performing processing, the location information provided by the receiving unit 250 will include just exactly or essentially what was received by it from the messaging unit(s) 52. In these latter cases, additional processing is first performed in this step 363, e.g., as described above in connection with step 272 and elsewhere, in order to identify an actual physical location for the messaging unit 250.

Depending upon the particular embodiment, just the current location of the receiving unit 250 is stored and/or used, or a history of where the receiving unit 250 has been over some period of time (e.g., during at least the past 5 minutes, 15 minutes, 30 minutes, one hour, two hours, four hours, eight hours, one day, three days or one week) is stored and/or used. Similarly, although a single receiving unit 250 is referenced above, in many embodiments the physical locations for a plurality of such receiving units are monitored, tracked, stored and/or used, such as at least 25, 50, 100, 200, 500, 1,000, 5,000 or 10,000 such receiving units. The more data points that are collected and stored, the more useful information that can be generated. For example, by tracking multiple receiving units 250, it can be possible to identify foot traffic patterns and/or bottlenecks and, as a result, to design more efficient floor plans and/or business processes.

Security Systems

Figure 17:
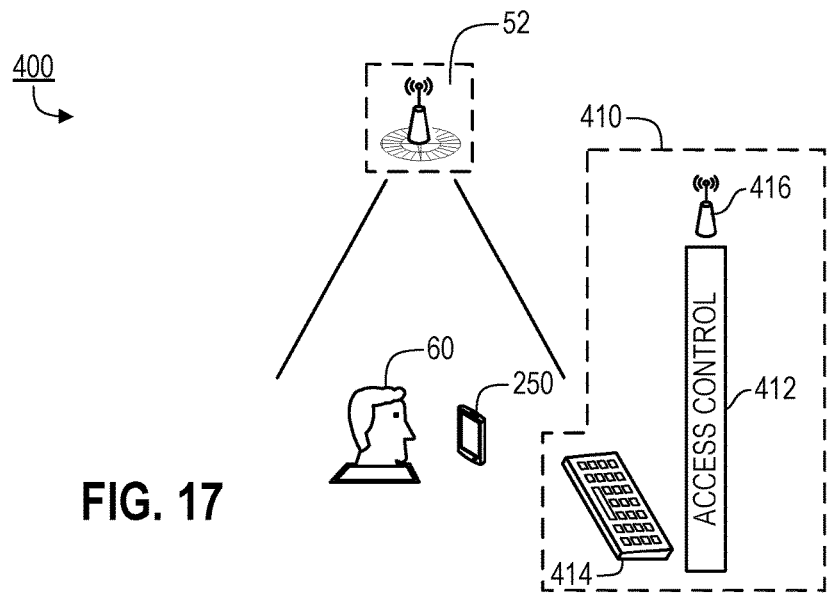
FIG. 17 is a block diagram illustrating a security system according to a representative embodiment of the present invention.

As noted above, a system according to the present invention can be implemented in a variety of different kinds of spaces and for a variety of different purposes. One set of embodiments includes security-system and/or access-control functionality. A block diagram of one such exemplary system 400 is illustrated in FIG. 17. As shown, system 400 includes a messaging unit 52, a receiving unit 250 and an access-control unit 410. Examples of hardware configurations for the messaging unit 52 and the receiving unit 250 have been described above. However, as discussed in greater detail below, in the present embodiments, these components are again configured somewhat differently from the other sets of embodiments discussed above, e.g., using different sets of computer-executable process steps (or software).

In the preferred embodiments, access-control unit 410 functions as, or at least controls, a gateway to a resource, such as stored information, one or more physical items or a physical space. Preferably, access-control unit 410 includes two main subcomponents: (1) an access-control component 412, which typically includes a processor, memory and/or other type of storage device, and which is the main processing component of access-control unit 410, performing the processing steps ascribed to access-control unit 410 below; and (2) one or more user interfaces, such as (a) a keyboard 414, a keypad (not shown), a touchscreen (not shown) or any other interface for entering information manually, (b) a radio receiver 416, an optical sensor (not shown) for receiving light-based communications, or any other interface for receiving information wirelessly, and/or (c) a physical port (not shown) for receiving a wired connection with receiving unit 250. In the discussion below, references to keyboard 414 can be replaced with references to any other interface(s) for entering information manually, and references to radio receiver 416 can be replaced with references to any other interface(s) for receiving information wirelessly.

Figure 18:
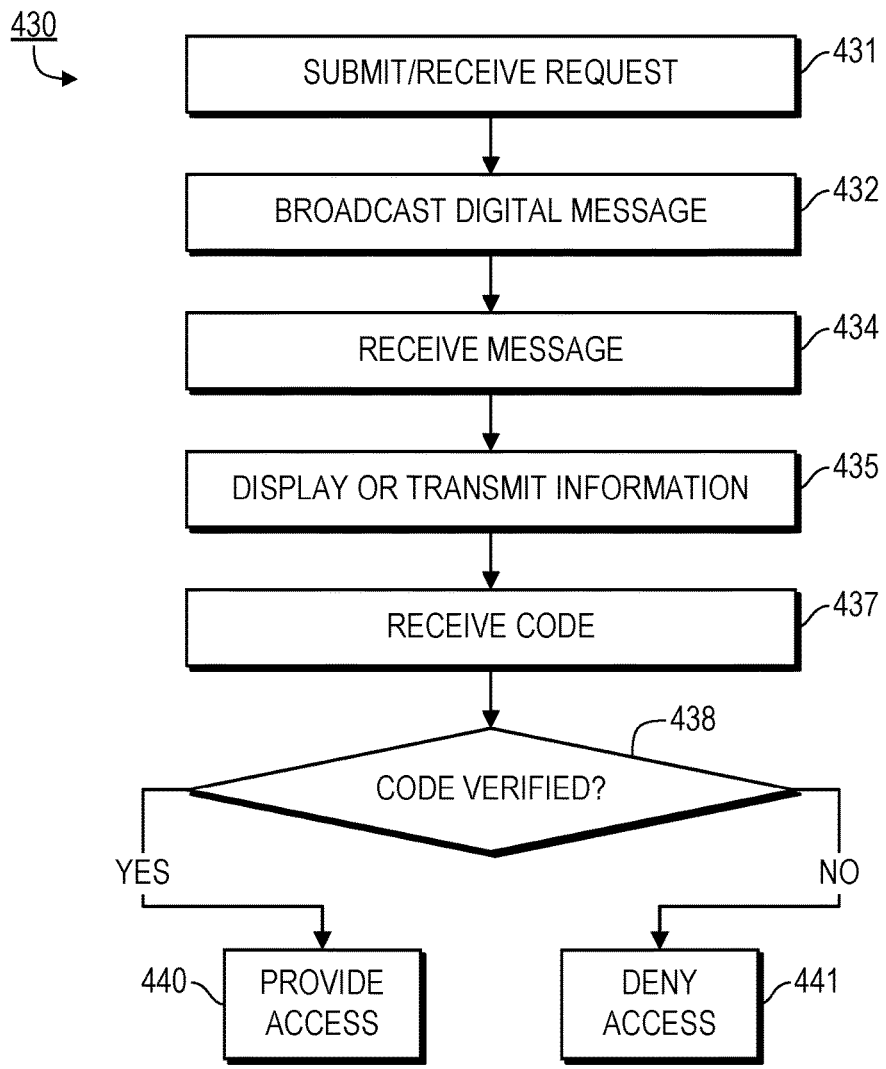
FIG. 18 is a flow diagram illustrating processing performed within a security system according to a representative embodiment of the present invention.

A description of how the foregoing components interact with each other within a system 400 according to certain representative embodiments of the present invention is now described with reference to FIG. 18. More specifically, FIG. 18 shows an overall process 430 in which some of the individual process steps are executed by the messaging unit 52, some are executed by the receiving unit 250, and some are executed by the access-control unit 410, as described in greater detail below. As will become apparent, although in some cases the individual process steps may be based on, or triggered by, manual input, such process steps preferably are mainly or substantially automated, being stored as computer-executable process steps, and executed by the processor associated with the corresponding device.

Initially, in step 431 a request is submitted by the receiving unit 250 and then received by the messaging unit 52 or by any other device that is in communication with access-control unit 410. In the preferred embodiments, this request signals a desire by the user 60 or the receiving unit 250 to have access to a protected resource. It can, for example, be transmitted wirelessly (e.g., via radio signals using radio transmitter 257 or via modulated broadcasts of light using LEDs or other light sources 258), entered manually (e.g., via keyboard interface 414), or submitted via a wire or cable connection. In any event, the request can be generic and/or can include information identifying the user 60 and/or the receiving unit 250. However, as discussed below, in certain embodiments, this step 431 is omitted.

In step 432, a digital message is broadcast by messaging unit 52. This step 432 can be triggered by the receipt of a request in step 431 or else, e.g., where step 431 is omitted, it can be performed periodically (e.g., continuously at intervals not greater than 1, 5 or 10 seconds), or it can be performed based on any other triggering condition (e.g., attempted access of the certain webpage, physical motion within a particular space, detection of a person in a particular location, and/or detection of a particular type of electronic device in a particular location). In any event, the digital message preferably is broadcast by flashing the light source 55 on and off, e.g., in any manner described above, and includes a secret (e.g., randomly or pseudo-randomly generated) code. Such a code can be generated independently or can be generated (e.g., using encryption and/or hashing) based on information (if any) within the request received in step 431 (e.g., information identifying the user 60 and/or the receiving unit 250).

In step 434, the receiving unit 250 receives the digital message that was broadcast in step 432 via its sensor(s) 252, which typically converts the light-based signal into an electrical signal. This electrical signal is then coupled to the processor 254 of the receiving unit 250.

In step 435, based on the message received in step 434, receiving unit 250 transmits or displays certain related information. In certain embodiments, the information transmitted or displayed in this step 435 is just the same information (e.g., code) received in step 434. In other embodiments, the received information is supplemented with information associated with the user 60 or the receiving unit 250, such as a personal password of the user 60, a code generated from a biometric scan of user 60 (e.g., a fingerprint or thumbprint, or a photograph of the user 60 or some feature of the user 60), a unique identification code for receiving unit 250, or any combination of the foregoing. Preferably, one or more of such codes is used as, or is used as the basis for, an encryption code to encrypt one or more of such other codes. In any event, the result preferably is a code indicating that the user 60 and/or the user's receiving unit 250 currently is in the vicinity of messaging unit 52. Such information can be transmitted, e.g., by modulating one or more light sources 258 or via a radio transmitter 257. Alternatively, such information can be simply displayed on a monitor 260 (e.g., in alphanumeric form or other format that is easily readable by a human, or in a more computer-friendly format, such as a QR code).

In step 437, an access code is received by access-control unit 410. If the information in step 435 had been transmitted, and then such information is received by an appropriate sensor or receiver (e.g., radio receiver 416) and the access code is derived therefrom in this step 437. Alternatively, if the information had been displayed in step 435, then, e.g., in this step 437: (1) it could be read optically (e.g., by having an optical sensor directly read the display from monitor 260); or (2) it could have been read by the user 60 who then inputs it (or a code based on the displayed information) manually (e.g., via keyboard 414).

In step 438, access-control unit 410 determines whether the received access code is correct (e.g., corresponds to a reference code that is based on the digital message broadcast by the messaging/modulation controller and/or matches an expected code for an authorized user 60 or an authorized receiving unit 250). If so, then processing proceeds to step 440 in which access to the desired resource is granted. If not, then processing proceeds to step 441 in which access is denied. In this regard, the granting of access may involve, e.g., providing access to restricted portions of a website, providing access (e.g., read, write or both) to any other restricted data, opening an electromechanical lock to permit access to a restricted location or space, making available certain restricted electronically-implemented or electronically-controlled functionality, opening restricted communication channels, or providing access to any other restricted physical, virtual or intangible resource.

Light-Based Communications Based on Characterization Information

Generally speaking, the embodiments discussed above concern systems, methods and techniques for communicating with a variety of users 60 within a particular space, such as customers within a retail or other commercial space. Such communications can be based on any of a variety of different factors. For example, in most of the previous embodiments, the communications are based on the current locations of the individual users 60 and, in some cases, based on the previous locations or movements of such users 60. Furthermore, in some of the previously discussed embodiments, the communications also (or instead) are based on individual characteristics or other previous activities of the users 60 and/or other individuals within the covered space. The present embodiments include additional options for providing user-specific communications, particularly for communicating based on the end-user's, the recipient's and/or their companions' individual characteristics.

Figure 19:
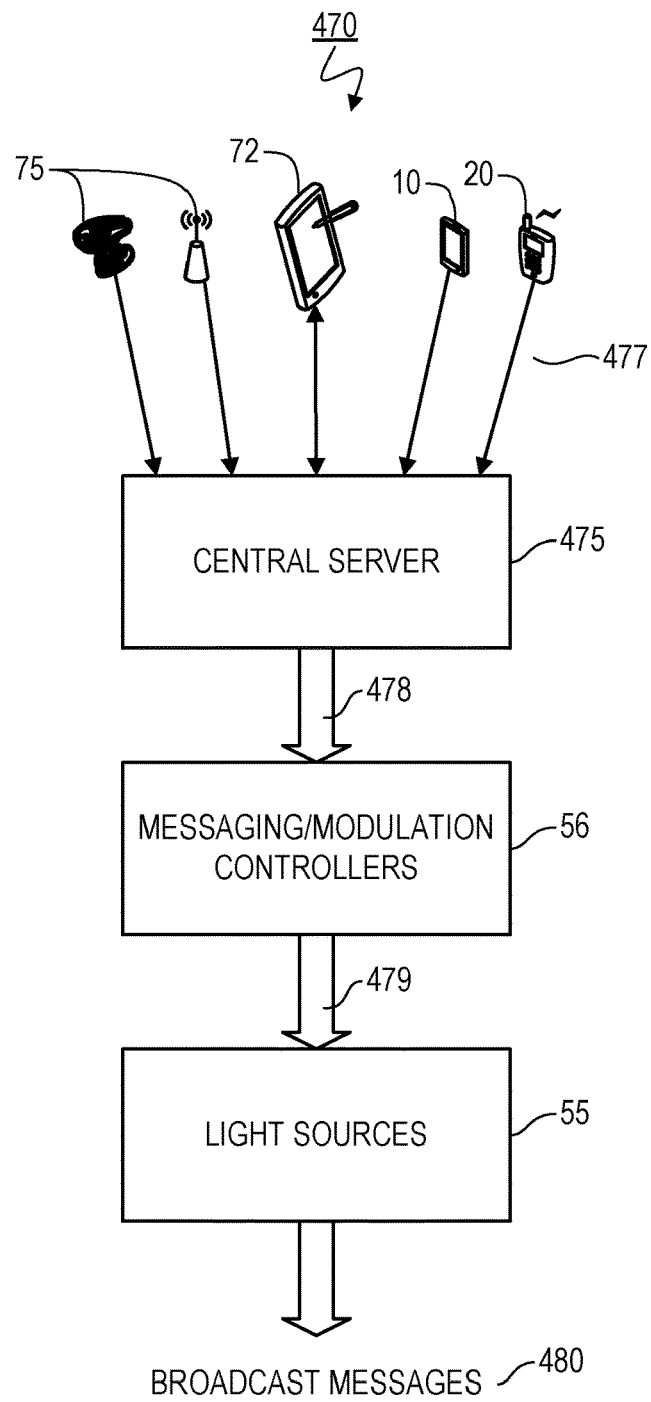
FIG. 19 is a block diagram illustrating a system for delivering messages based on user characteristics according to a representative embodiment of the present invention.

The present embodiments can operate within the context of a variety of different systems, such as system 50 or system 200, described above. One such system 470 (which otherwise could have structure of system 50 or system 200) is illustrated in FIG. 19. As shown, system 470 has a central server 475 which can include, e.g., computer 65, server 205 or a combination of the two. Central server 475 preferably receives information 477 from various sources (such as those noted below) and then processes such information 477 to create or identify messages 478 to be broadcast or otherwise sent (and subsequently received and displayed by the user devices 10 or 20 of individual users 60) based on such information 477. More preferably, central server 475 causes the identified messages 478 to be distributed to the appropriate messaging/modulation controllers (e.g., controllers 56), which in turn output control signals 479 to the light sources 55, causing them to broadcast such messages 478 by modulating their light output 480 (e.g., using a selected encoding technique so that they can be received by the appropriate user devices 10 or 20).

Information 477 preferably pertains to the individual users 60 and, in some cases, also pertains to other people within the covered space (e.g., as described in greater detail below). As noted above, such information 477 can be collected in any of a variety of different ways, using a variety of different system components. For example, the user 60 might submit information about, or a profile of, himself or herself through a user device 10 or 20, or through a different computer or device. In addition, or instead, one or more sensors (e.g., sensors 75 or sensors on the user devices 10 or 20) can be used to automatically collect information regarding the users 60 and/or such other people. Still further, information 477 may be manually input by a different person, such as an associate 73 using a device 72. Generally speaking, such information-collection approaches can be divided into substantially automated approaches using sensors or substantially manual approaches using input devices, although hybrid devices that permit a combination of such approaches also (or instead) may be employed.

As to the use of automated sensors 75, many options are available. For example, cameras can be used to capture still images or video, which can then be stored for future reference and also manually examined and/or automatically processed using available algorithms to identify any desired information, such as approximate age and gender, height, facial characteristics, or other biometric information, which then can be used to recognize, or to confirm the identities of, individual people. RFID sensors, operating in conjunction with RFID tags on individual items, can be used to determine, e.g., what objects an individual picks up and/or how long he/she holds them. Infrared sensors can be used to detect individual people. Laser range finders can be used in conjunction with cameras or other sensors to identify locations of people. Radio receivers (e.g., having scanning directional antennas) can be used to locate individuals using wireless devices, e.g., including those who are not communicating within a system according to the present invention. Information 477 from multiple different sensors 75 (e.g., any of the foregoing sensors) can be used by central server 475 to triangulate the locations of individual people. In certain embodiments, e.g., using any of the techniques described herein, the central server 475 tracks the locations of the users 60 and, in some cases, other individuals as well.

Sensors on the user 60's device 10 or 20 (e.g., under control of a user app for communicating within the present system 470) can obtain information regarding, e.g., movements made by the user 60, Web browsing history, texting history, e-mailing history, telephone use history and various other previous explicit uses of the device 10 or 20 by the user 60, as well as the times and locations of such uses. Then, the user app causes such information (or information derived from such information, e.g., to protect the user 60's privacy) to be transmitted along with the other information 477 to the central server 475.

As noted above, the central server 475 preferably implements a tracking system that tracks locations of users 60 and, in some cases, of the people within the covered space. Typically, such a tracking system inputs sensor data (discussed above) and then combines such data using available techniques (such as triangulation, Kalman filtering, etc.) to generate the tracking information.

Such tracking information is then combined with all of the other collected information 477 to identify or obtain the messages 478 that are directed to individual users 60, e.g., using collaborative filtering, neural-network processing, clustering algorithms and/or any of the other techniques described herein or otherwise available for identifying effective messages, particularly available techniques for targeting advertising messages. The combination of long-term data (such as gender and age) and temporary data (such as an assessment of the user 60's current mood) often can provide for much better message targeting that is available conventionally. In addition, the combination of automatically collected data and real-time input from human observers can further improve such targeting. Still further, use of current information regarding a user 60's companions, as well as information regarding the user 60 himself or herself, often can provide even more relevant message targeting, e.g., by taking into account any influences such companions are likely to have on the user 60's purchasing decisions and/or any distractions such companions are causing user 60.

With respect to manual input, clustering, machine-learning and other statistical techniques can be used to evaluate and weight the inputs from different associates 73, either on an overall basis or on a characteristic-by-characteristic basis. For example, one associate 73 might be very good at estimating the ages of users 60, while another might be good at assessing a user 60's current mood. By statistically correlating such assessments over a large number of characteristics and individual users 60, correlation strengths can be determined so that future assessments can be weighted more or less heavily based on who the associate 73 is and what the specific characteristic is.

For the foregoing purposes, the raw information 477 provided by sensors 75, provided by sensors on the user devices 10 or 20, input by the users 60 themselves, input by an associate 73, or obtained in any other way may be directly used by the central server 475 or may be first processed to obtain more relevant derivative information that is then used in constructing or identifying effective messages. In the preferred embodiments, the particular information to use is identified based on statistical evaluations of the types of information that are most relevant to achieving a particular defined goal or subgoal.

In this regard, the goals sought to be achieved by a system 470 according to the present embodiments can include, e.g., motivating the user 60 to: move to a different location within the covered space, purchase or at least examine or consider a particular item, engage in a game or contest, participate in some other group activity, or communicate with friends or family by telephone or electronic messaging. Once a particular goal has been identified (e.g., by a manager or other individual associated with the system 470), the particular messages 478 preferably are selected by the central server 475 so as to maximize the likelihood that the users 60 will take the corresponding action. In addition, the same user-specific information-based approach can be used to first identify subgoal(s) that are likely to cause individual users 60 to take the action associated with the main goal and then to communicate messages 478 that are likely to cause the individual users 60 to engage in the action(s) corresponding to such subgoal(s).

Figure 21:
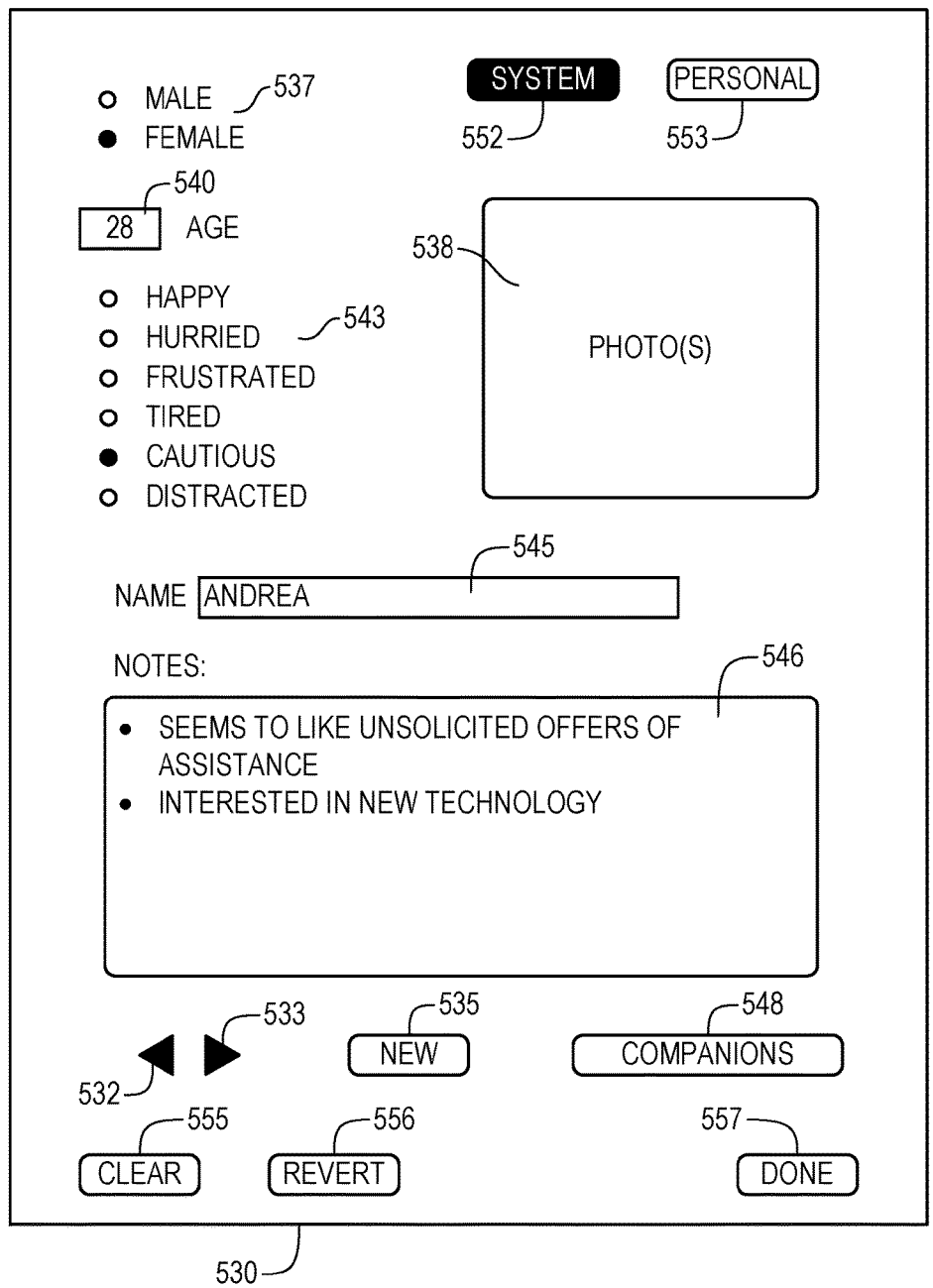
FIG. 21 is an exemplary page of a user interface for inputting and displaying information regarding a user or other individual.
Figure 22:
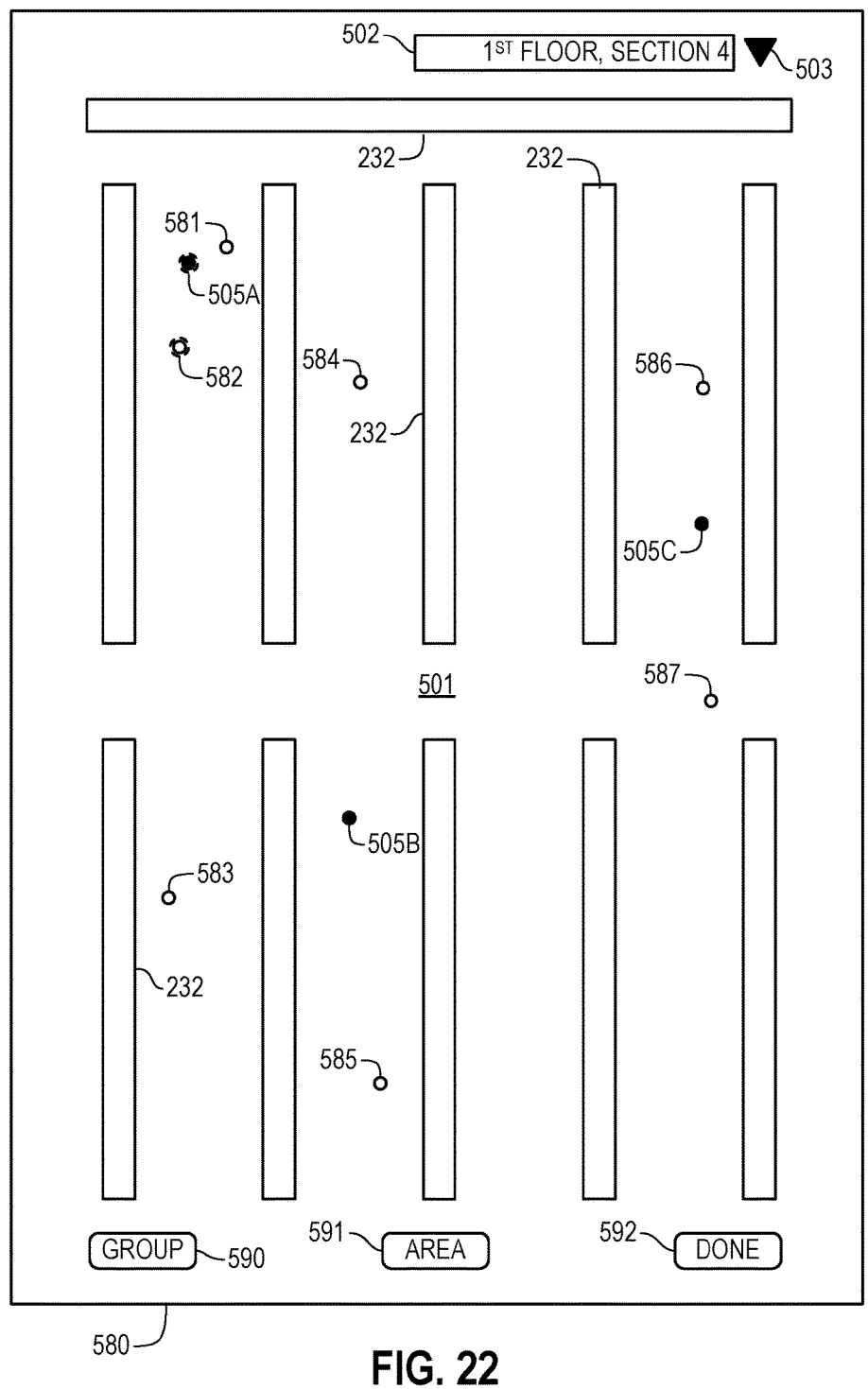
FIG. 22 is an exemplary page of a user interface showing the layout of a portion of a covered space and the locations of registered, active users and other individuals.

As noted above, the information 477 also can be input manually, either by the user 60 or by other individuals, such as one or more associates 73. In the former case, the information 477 generally is input when the user 60 manually creates a profile, which is then transmitted to central server 475. In the latter case, associate device 72 preferably provides a dedicated user interface for inputting information regarding the user 60 and, in certain cases, other individuals as well. Pages 500, 530 and 580, taken from one example of such a user interface, are illustrated in FIGS. 20-22, respectively.

Figure 20:
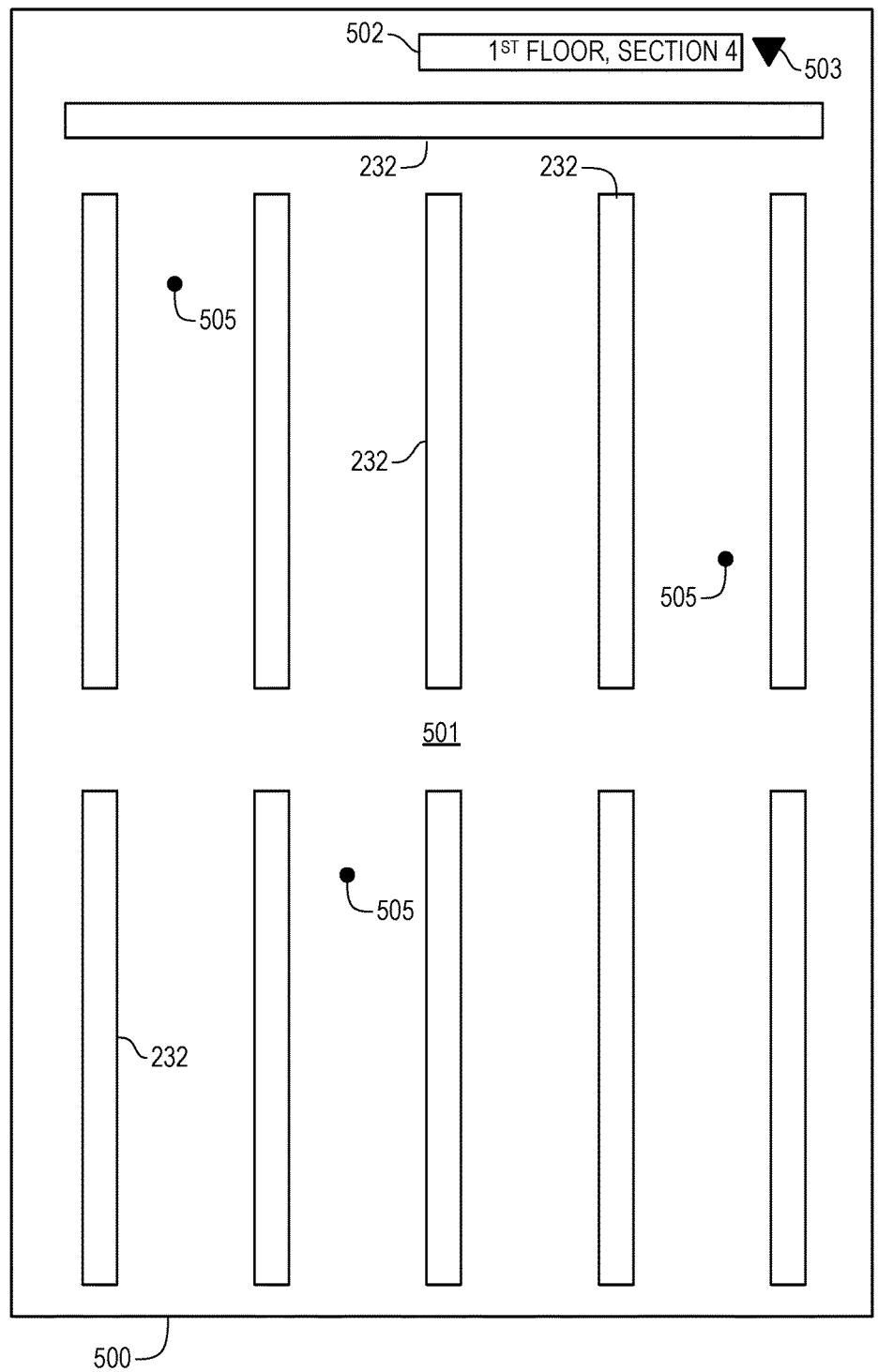
FIG. 20 is an exemplary page of a user interface showing the layout of a portion of a covered space and the locations of registered, active users.

Interface page 500, shown in FIG. 20, displays a section 501 of the space covered by a LiFi system 470 (e.g., configured as system 50 or 200) according to the present invention. The particular section 501 illustrated on page 500 is identified in box 502. When the down arrow 503 is touched or clicked, a drop-down list is displayed and a different section of the covered space may be selected for illustration. Alternatively, a graphical user interface page that displays the entire covered space, divided into sections, may be displayed so that the associate 73 has the ability to select or designate the section that is desired to be displayed. In fact, such an overall map of the entire covered space may be presented initially for the associate 73 to select the desired section to view. However, in the preferred embodiments, the current location of associate 73 is tracked by central server 475 and the section corresponding to associate 73's current location is displayed by default, with the displayed section automatically changing as associate 73 moves through the covered space, using either predefined sections or ad hoc sections, based on associate 73's current location (as to the latter, e.g., with the currently displayed section being centered at associate 73's location).

In the present example, the covered space is a commercial space, such as a retail store or a mall, and the illustrated section 501 includes shelves 232. To further assist the associate 73 (in this example, typically a salesperson or sales associate), the shelves or any other areas of the displayed section 501 optionally are labeled with the types of items that are located in that subsection or with any other information that can provide the associate 73 with visual context.

In any event, the locations of some or all of the users 60 are designated by icons 505 (in the present example, black dots). In the present embodiment, the icons 505 are displayed only for registered users 60 whose user devices 10 or 20 are on and are in bidirectional communication with the system 470 (e.g., those transmitting signals from their user devices 10 or 20 to the central server 475 through the LiFi network, a Wi-Fi network or in any other manner). As a result, e.g., using any of the techniques discussed herein, a fairly precise location of each such user 60 typically can be obtained. By displaying such locations in this way, it is possible for an associate 73, operating an associate device 72, to easily match up individuals he or she sees within section 501 with the icons 505 that are displayed on interface page 500. Optionally, the location of associate device 72 also is displayed on page 500, e.g., to even better assist associate 73 in matching customers or other users 60 to the displayed icons 505.

Then, touching or clicking on one of the icons 505 preferably causes a new user-interface page to be displayed, e.g., one that permits information about the corresponding user 60 to be input and/or that displays information already known about such user 60. An example is page 530, shown in FIG. 21.

In the preferred embodiments, page 530 is pre-populated by the central server 475 with information it has previously obtained. More preferably, information that has been previously input by the current associate 73 (e.g., the logged-in user on the device 72 on which page 530 currently is being displayed) is highlighted (e.g., displayed in bold, in a different color, or in some other distinguishing manner) as compared to information obtained by central server 475 in other ways. In the current embodiment, the associate 73 has the ability to modify (e.g., update) or supplement any of the displayed (e.g., pre-populated) information.

In addition, in some cases it will be apparent that the information previously obtained does not correspond to the actual user 60 that the associate 73 is observing. This might be because, e.g., a single user device 10 or 20 is shared by two or more people (such as a husband and a wife). In that case, arrow buttons 532 and 533 can be used to navigate backward or forward, respectively, among the various individuals who previously have been associated with the current user device 10 or 20 or with the current login information for the user 60, e.g., with each click or touch of one of the arrow buttons 532 or 533 bringing up a page 530 that has been pre-populated with personal characteristic information corresponding to a different individual who has previously been observed in connection with the present user device 10 or 20 or the present login information, as applicable. If none of these previously observed individuals seem to match the present individual, "New" button 535 can be touched or clicked to bring up a blank page 530 for inputting information about the current individual.

A variety of different types of information can be input and/or can be pre-populated and displayed within page 530. In addition, although only a single such page is discussed, multiple different information pages can be provided for each individual. The specific information shown on page 530 includes a designation of gender (selectable by clicking on one of the radio buttons 537), one or more photographs that are displayed in region 538, age field 540, name field 545 and a field 546 for any additional notes. However, these types of information are merely exemplary. Fields, buttons or any other user interface elements for any of a variety of other kinds of information about the user 60 may also (or instead) be included, typically depending upon what information is deemed most useful for the desired purposes. Examples include: current manner of dress (e.g., business professional, business casual, recreational, trendy or urban), ZIP code or other indication of the user's neighborhood of residence, interests, social media friends or contacts, or any other personal or demographic information.

On the other hand, a great deal of information 477 may be collected by the central server 475, while only a portion of it is displayed on page 530. Typically, it will be most desirable to include on page 530 information types that either: (1) are only (or at least best) capable of being personally observed and/or (2) would be useful to an associate 73 in talking to or otherwise personally interacting with the corresponding user 60. Also, in certain embodiments the fields and/or choices displayed on page 530 are varied dynamically based on previously input or otherwise obtained information, such as different choices for mood buttons 543 depending upon the user 60's age and gender.

Generally, unless there is an indication that the determination was made by an automated process, once one of the male/female radio buttons 537 has been selected it will not be subsequently changed by the current associate 73. However, in certain cases, e.g., where gender has been machine-designated based on captured video(s) or image(s), the associate 73 might change the initial designation.

In any event, to assist the associate 73 in confirming that the current user 60 is the same individual whose information is being presented on the current page 530, in certain embodiments previously taken photographs are displayed in region 538 (e.g., along with navigation arrows if more than one).

Once an estimated age has been entered into the field 540 (or subsequently updated), the central server 475 preferably automatically updates it in response to the passage of time. Also, multiple different age estimates (e.g., from different associates 73 or input at different times) may be combined (e.g., averaged) together, for purposes of pre-populating field 540 on this page 530 and/or for use in other ways by the central server 475.

A set of buttons 543 permits the associate 73 to select the currently perceived mood of the user 60. In the preferred embodiments, any number of applicable labels may be selected. However, in alternate embodiments, buttons 543 are radio buttons so that only one may be selected. As discussed in greater detail below, this information can be particularly useful in directing messages to the user 60, and it is the type of information that is typically very difficult to determine through automated analysis.

Field 545 displays the name of the user 60, if previously obtained, or allows the associate 73 to enter a name, e.g., if he or she learns it during a conversation with user 60. Again, this information preferably is highlighted to indicate whether the current associate 73 previously was told the user's name or whether it was obtained in some other manner. Alternatively, such information might not even be displayed to the current associate 73 unless the same individual previously entered it. The main reason for these displays features is that many users 60 (e.g., customers) might feel uncomfortable if someone he or she has not previously spoken with addresses him or her by name.

Field 546 permits entry and display of additional information (e.g., arbitrary or unformatted notes) about the user 60. Similar to buttons 543, field 546 permits inputting of personal observations about the user 60. However, the information in notes field 546 typically will be most useful to the associates 73 themselves, e.g., in providing cues about how to approach the user 60 and/or about what to say to user 60. At the same time, available automated tools often will be able to extract meaning from these notes 546 and then use such information in directing messages or other communications to the user 60 (or at least suggesting such messages). Once again, for reasons similar to those mentioned above, the notes 546 that previously have been input by the current associate 73 preferably are highlighted. In the particular illustrated example of field 546, each individual note is designated by a separate bullet. In addition, each note could be accompanied by metadata, indicating, e.g., who input it and/or the date and time it was entered.

For any of the fields displayed on page 530 (e.g., any of fields 540, 545 or 546), information preferably can be entered or altered using any available user interface mechanisms, such as clicking or touching within the field and then typing in order dictating the information. For tablets and similar touchscreen devices, touching within any such field preferably results in the display of a pop-up numeric keypad or alphanumeric keyboard, as applicable, for entering the corresponding information.

As discussed above, user-interface elements 532, 533 and 535 are for associating different individuals with a single user login and for navigating among those different individuals. In addition, the user 60 often will have other individuals with him or her, such as family members, friends or other companions. For those situations, in the present embodiment, clicking or touching the Companions button 548 causes a new page to be displayed, preferably identical to page 530 but for specifying and viewing information pertaining to the main user 60's individual companions. In this new page: arrow buttons 532 and 533 can be used for selecting from among different individuals who previously were identified as companions for user 60; button 535 can be used to create a new record for, and input information regarding, a new companion; and button 548 (preferably now labeled "Back", "Device Owner" or "Registered User") returns the associate 73 back to page 530, showing information for the user 60.

The preceding discussion generally describes an embodiment in which information presented to the associate 73 can include, in addition to information originally input by that particular associate 73 himself or herself, other information that was input by other associates 73 and/or obtained in other ways. This ordinarily will be the preferred mode, so that each associate 73 has access to all or almost all available information that either would be useful to him/her in his/her interactions with the users 60 or would allow him/her to avoid having to input information that has already been input by another associate or obtained in some other way. However, in the current embodiment, the associate 73 has the option of selecting button 552 to display information in the "system" mode (in which such information is displayed irrespective of how it was obtained, as generally discussed above) or button 553 for the "personal" mode (in which only information previously input by the present associate 73 is displayed). In alternate embodiments, only the personal mode is available (i.e., so that the associate 73 does not have a choice).

Finally, clicking or touching the "clear" button 555 clears all information from page 530, clicking or touching the "revert" button 556 reverses the last change made by associate 73, and clicking or touching the "done" button 557 saves the current information to the central server 475 and returns the user interface to page 500.

In addition to displaying other information about the user 60, page 530 (or any other page of the user interface) optionally can display a variety of different kinds of messaging information. For instance, it could display any or all of: proposed messages for sending to this particular user 60, which the associate 73 can then accept, reject or modify; or messages that were previously sent to the user 60, e.g., together with the date and time they were sent, so that the associate 73 can be better informed when speaking with or otherwise interacting with the user 60.

In the preceding embodiments, the central server 475 only tracks the positions of registered users 60 whose user devices 10 or 20 are on and are in bidirectional communication within the system 470. However, in alternate embodiments sensors 75 (e.g., cameras or infrared sensors to detect the individuals themselves or radio receivers to obtain locations based on the transmissions from people's wireless devices) are used to track the locations of other individuals within the covered space, i.e., those were not communicating within the system 470. As result, it often will be the case that less is known about these individuals.

For such an embodiment, rather than using page 500, page 580 (shown in FIG. 22) is used to display a selected portion 501 of the covered space. In page 580, the user 60 who are in bidirectional communication with the system are designated with black dots 505A-C and the other detected individuals within the space are designated with open circles 581-587. In addition to the functionality described above in connection with page 500, page 580 also provides the following functionality. Touching or clicking on any of the open circles 581-587 causes an information page 530 for that individual to be displayed, although in many cases, without some ability to store identifying information for such individuals, it might be difficult to store and retrieve information for a single individual from one visit to the next. Facial recognition or other biometrics may be used for this purpose. Also, or instead, as indicated above, previous designations as a companion of a user 60 can be used in maintaining the identity of such non-registered individuals.

In this regard, page 580 provides the associate 73 with the ability to designate which of the other detected individuals appears to be with a particular user 60. Such functionality is initiated by touching or clicking on the "group" button 590. Once this has been done, touching or clicking individual icons (e.g., any of icons 505A-C and/or icons 581-587), rather than bringing up information pages 530, instead causes such icons to be highlighted indicating that they are a group of people who are together. Thus, for example, in FIG. 22, the associate 73 has touched icons 505A and 582 (as indicated by the fact that they are now highlighted), meaning that associate 73 believes them to be together. At the same time, the individual corresponding to icon 581, although in close proximity to this group, has not been highlighted as being with them. Alternatively, rather than (or in addition to) designating companions individually, associate 73 can click or touch "area" button 591 and then draw an area, causing all icons within that area to be highlighted as being together. Once all members of a particular group have been highlighted in either manner, the "done" button 592 is touched or clicked to save the information to the central server 475 and return page 580 to its default state (i.e., no highlighting of the icons). This procedure can be repeated as many times as desired, in order to identify any number of groups of people who appear to be together.

Other Exemplary Embodiments

As will be readily apparent, the present invention is ideally suited to any environment in which a high level of spatially dependent messaging is desired. In addition, because the systems of the present invention can integrate with, and use much of the same infrastructure as, energy-efficient LED and other lighting, such systems can be extremely cost-efficient as well as energy-efficient.

One application of a system according to the present invention is in education, such as primary-level and secondary-level classrooms (e.g., elementary schools, middle schools and high schools). However, any other educational setting could benefit from such a system. For example, with such a system an instructor can divide the class into different groups, e.g., with each group learning different material, or learning the same material but at different speeds. Then, messaging units 52 in the different locations, corresponding to the different groups, can be used to communicate different content that is relevant to each individual group's particular focus. Such groups can be made as large or as small as desired, even to the point that each "group" can consist of just a single student (e.g., by using desk lamps as the light sources 55 for the messaging units 52), so that individualized communications are possible. In addition, or instead, each classroom can be designated as a different group, receiving different messages than the other classrooms. Also, rather than designating groups, an instructor can designate different "learning stations" where different material is taught, explored or practiced, with the students moving among such different stations.

Similar communications/messaging can be used in connection with less-formal educational settings, such as museums, galleries, displays, exhibitions or tourist sites. Here, the same light source that is used to illuminate a particular exhibit or other item of interest also can be used to communicate information regarding that exhibit or item and/or to communicate information about any similar or related exhibits or items.

Other locations in which systems according to the present invention can be beneficial include hospitals, urgent-care centers and other medical facilities. Here, the messaging units 52 preferably broadcast information that is relevant to their corresponding physical locations, such as information (e.g., medical history, current medical condition, personal preferences or other personal information) regarding a patient within that patient's room or within an operating room into which a patient has been or will be moved.

Still further, a system according to the present invention can utilize (e.g., work in conjunction with) any existing or future public, municipal, commercial or other lighting system or set of individually controlled lights. In one embodiment, traffic lights are used to broadcast information, such as information pertaining to events or conditions within the local vicinity (e.g., traffic, road conditions, detours, local events or traffic-light timing) or even information pertaining to businesses or other commercial activities (e.g., to generate revenues for the corresponding municipality). In more-specific embodiments, a sensor within a smartphone or within a user's automobile receives traffic-light timing information in this manner, and then an associated processor retrieves and uses GPS, traffic and/or vehicle speedometer information, in conjunction with such traffic-light timing information, to generate messages that advise the driver: whether he/she is safe to proceed, whether to speed up in order to make it through the intersection before the light turns red, or whether to prepare to stop because it is not possible to make it through the intersection safely or legally. Because traffic signals are directional, different information can be broadcast to drivers based on the direction in which they currently are traveling. In addition, through integration with the vehicle's or smartphone's GPS, the incoming information from the traffic light can be filtered and/or used based on relevance to the user's current route or relevance to the user in any other way. Still further, streetlights and/or illuminated commercial signs can be configured to broadcast any desired information to drivers, bicyclists, pedestrians, etc.

In most of the embodiments described above, the messaging units 52 are in fixed locations. However, in certain embodiments messaging units 52 are mobile. For example, in one alternate embodiment one or more automobiles (and/or other transportation vehicles, such as trucks, buses, streetcars, other modes of public transit, motorcycles or bicycles) are configured so as to provide the functionality of messaging units 52, e.g., with their headlights, taillights and/or any other already-existing or additional add-on lights functioning as the light sources 55. In these embodiments, the vehicles preferably broadcast information regarding themselves, such as their current route information (e.g., obtained from an onboard GPS system or via a Bluetooth or other wireless connection to a smartphone implementing a navigation system), their current speed or location, whether they are about to break or accelerate (e.g., when coupled to an automated driving system), whether the driver's foot is positioned on or above the accelerator or the brake, and/or even vehicle or driver identification information (e.g., for reception and use by police cars). Any or all of this information can be received by other vehicles for use in automatically controlling the driving or operation of such other vehicles and/or for providing alerts to the drivers of such other vehicles. In addition, or instead, such information can be received by traffic sensors for use in controlling or guiding overall traffic flow and/or by any other sensors for any other purposes.

In still further embodiments, mobile messaging units 52 are implemented as flashlights, cellphone lights (e.g., light sources 14), keychain lights or any other portable lights. In the preferred embodiments, such mobile messaging units 52 are configured to broadcast information about the corresponding user, which information is then received and used for any of a variety of purposes, such as security, identification and/or team coordination. For instance, a properly configured keychain light or other flashlight can be used, not only to provide illumination, but also to broadcast a code that unlocks a home or automobile lock. A police or firefighter's flashlight can be configured to also broadcast a code identifying the officer or firefighter to his or her colleagues and/or to provide other immediately relevant information, such as a live video from the individual's helmet cam for coordinating the activities of multiple individuals. Similar light-based messaging also can be employed by automated and/or robotic devices at an emergency scene, e.g., for similar purposes.

Also, in the embodiments discussed above, the user device 10 or 20 generally is a smartphone, tablet or other portable handheld electronic device. However, user device 10 or 20 instead could be implemented as any other kind of device, or any combination of devices. For instance, the sensor portion 12 for receiving light-based messages can be implemented as an eyeglass camera, such as currently is implemented in the Google Glass product, or any other type of wearable sensor. The light source portion 14 for broadcasting light-based messages can be implemented as a light on a handheld device, a wearable light source or any other kind of light. Still further, the sensor 12, light source 14 and processor 254 can be included within a single device or provided with in multiple different devices that are coupled to each other.

In short, communication systems according to the present invention can involve any mixture of fixed and mobile messaging units 52 and user devices 10 or 20. Both the messaging units 52 and the user devices 10 or 20 can take on any of a variety of different forms, for any of a variety of different purposes.

In each of the foregoing embodiments, not only are highly specific location-based communications facilitated, but such communications can be very secure. On that basis, systems of the present invention can be distinguished from Wi-Fi networks and other radio-frequency-based communications in which the communications signals penetrate walls and other structures and are, therefore, more easily monitored by others than are light-based communications according to the present invention.

Finally, in any of the embodiments discussed herein that refer to light-based or LiFi communications, it should be understood that the referenced communications can be performed exclusively using such light-based or LiFi approaches. Alternatively, any of such communications instead can be performed in part using such light-based or LiFi approaches and in part using any other (preferably wireless) communications systems, such as Wi-Fi, cellular-based, Bluetooth or near-field communications. Similarly, in any embodiment according to the present invention, the referenced light-based or LiFi approaches can be used in conjunction with one or more other communications systems, such as where the light-based or LiFi approach is used for the final link in communicating with an end user and one or more other additional communications systems are used to reach a desired server.

System Environment.

Generally speaking, except where clearly indicated otherwise, all of the systems, methods, functionality and techniques described herein can be practiced with the use of one or more programmable general-purpose computing devices. Such devices (e.g., including any of the electronic devices mentioned herein) typically will include, for example, at least some of the following components coupled to each other, e.g., via a common bus: (a) one or more central processing units (CPUs); (b) read-only memory (ROM); (c) random access memory (RAM); (d) input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (e) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (f) a display (such as a cathode ray tube display, a liquid crystal display, an organic light-emitting display, a polymeric light-emitting display or any other thin-film display); (g) other output devices (such as one or more speakers, a headphone set and/or a printer); (h) one or more input devices (such as a mouse, touchpad, tablet, touch-sensitive display or other pointing device, a keyboard, a keypad, a microphone and/or a scanner); (i) a mass storage unit (such as a hard disk drive or a solid-state drive); (j) a real-time clock; (k) a removable storage read/write device (such as a flash drive, any other portable drive that utilizes semiconductor memory, a magnetic disk, a magnetic tape, an opto-magnetic disk, an optical disk, or the like); and/or (l) a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop, tablet or slate) computers and/or even smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

As used herein, the term "coupled", or any other form of the word, is intended to mean either directly connected or connected through one or more other elements or processing blocks.

Additional Considerations.

In the event of any conflict or inconsistency between the disclosure explicitly set forth herein or in the attached drawings, on the one hand, and any materials incorporated by reference herein, on the other, the present disclosure shall take precedence. In the event of any conflict or inconsistency between the disclosures of any applications or patents incorporated by reference herein, the more recently filed disclosure shall take precedence.

In certain instances, the foregoing description refers to clicking or double-clicking on user-interface buttons (typically in reference to desktop computers or laptops), touching icons (typically in reference to devices with touchscreens), dragging user-interface items, or otherwise entering commands or information via a particular user-interface element or mechanism and/or in a particular manner. All of such references are intended to be exemplary only, it being understood that each such reference, as well as each other aspect of the present invention as a whole, encompasses entry of commands or information by a user in any of the ways mentioned herein or in any other known manner, using the same or any other user-interface mechanism, with different entry methods and different user-interface elements being most appropriate for different types of devices and/or in different situations. In addition, or instead, any and all references to inputting commands or information should be understood to encompass input by an automated (e.g., computer-executed) process.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A security system, comprising:
    a messaging unit, including a light source;
    a messaging/modulation controller coupled to the light source and configured, in response to a received request for access to a resource, to turn the light source on and off so as to broadcast a digital message as a light-based signal;
    a receiving unit that includes: (i) a light sensor that receives light from the light source and converts the light-based signal into an electrical signal, and (ii) a processor, coupled to the light sensor, that at least one of transmits or displays information based on said electrical signal; and
    access-control means for inputting an access code and controlling access to the resource based on whether said access code corresponds to a reference code that is based on the digital message that was broadcast by the messaging/modulation controller through the light source,
    wherein the digital message broadcast by the messaging/modulation controller includes a code that has been generated based on information within the request.

2. A security system according to claim 1, wherein the resource comprises at least one of stored information, a physical item or a physical space.

3. A security system according to claim 2, wherein the resource comprises a physical space.

4. A security system according to claim 1, wherein the access code is generated by the receiving unit supplementing the digital message that has been received with additional information associated with at least one of the receiving unit or a user of the receiving unit.

5. A security system according to claim 4, wherein said additional information comprises at least one of a personal password of the user or a code generated from a biometric scan of the user.

6. A security system according to claim 4, wherein said additional information comprises at least one of a fingerprint, thumbprint, or photograph of the user.

7. A security system according to claim 1, wherein the access code is displayed on a monitor of the receiving unit and is input into the access-control means by reading it with an optical sensor.

8. A security system according to claim 1, wherein the access code is displayed on a monitor of the receiving unit and is manually input into the access-control means by a user of the receiving unit.

9. A security system according to claim 1, wherein the access code is transmitted by the receiving unit by at least one of (a) modulating at least one light source or (b) using a radio transmitter.

10. A security system according to claim 1, wherein the light source in said messaging unit is a light-emitting diode (LED).

11. A security system according to claim 1, wherein the receiving unit comprises a handheld device.

12. A security system according to claim 11, wherein the receiving unit receives the light from the light source using at least one built-in camera.

13. A security system according to claim 1, wherein access to the resource also is controlled based on whether the input access code matches an expected code for at least one of an authorized user or an authorized receiving unit.

14. A security system according to claim 1, wherein said access-control means at least one of functions as a gateway to, or controls a gateway to, said resource.

15. A security system according to claim 14, wherein said resource is a physical space.

16. A security system according to claim 14, wherein said resource is stored information.

17. A security system according to claim 1, wherein the digital message broadcast by the messaging/modulation controller includes a code that has been generated using at least one of encryption or hashing based on information within the request.

18. A security system according to claim 1, wherein the access code comprises a combination of the broadcast digital message and information associated with at least one of the receiving unit or a user of the receiving unit.

19. A security system according to claim 18, wherein said combination comprises using a first one of said broadcast digital message and said information to encrypt a second one of said broadcast digital message and said information.

\* \* \* \* \*

UNITED STATES PATENT AND TRADEMARK OFFICE
CERTIFICATE OF CORRECTION

PATENT NO. : 10,068,396 B2
APPLICATION NO. : 14/996718
DATED : September 4, 2018
INVENTOR(S) : John C. S. Koo Page 1 of 1

It is certified that error appears in the above-identified patent and that said Letters Patent is hereby corrected as shown below:

On the Title Page

Add a new paragraph as follows:
-- Related U.S. Application Data
(60) Continuation of application No. 13/954,319, filed on Jul. 30, 2013, now Pat. No. 9,270,627, which is a continuation in part of application No. 13/787,737, filed on Mar. 6, 2013, which is a continuation in part of application No. 13/559,372, filed on Jul. 26, 2012, now Pat. No. 8,924,255. --

Signed and Sealed this
Twenty-third Day of October, 2018

Andrei Iancu
*Director of the United States Patent and Trademark Office*